(12) United States Patent
Boesgaard Soerensen

(10) Patent No.: US 8,949,607 B2
(45) Date of Patent: Feb. 3, 2015

(54) DIGITAL DATA AUTHENTICATION

(71) Applicant: Hans Martin Boesgaard Soerensen, Lyngby (DK)

(72) Inventor: Hans Martin Boesgaard Soerensen, Lyngby (DK)

(73) Assignee: Codesealer APS, Valby (DK)

(*) Notice: Subject to any disclaimer, the term of this patent is extended or adjusted under 35 U.S.C. 154(b) by 73 days.

(21) Appl. No.: 13/889,764

(22) Filed: May 8, 2013

(65) Prior Publication Data

US 2013/0254845 A1 Sep. 26, 2013

Related U.S. Application Data

(63) Continuation of application No. 12/448,249, filed as application No. PCT/EP2007/063983 on Dec. 14, 2007, now Pat. No. 8,468,351.

(60) Provisional application No. 60/874,955, filed on Dec. 15, 2006, provisional application No. 60/907,465, filed on Apr. 3, 2007, provisional application No. 60/935,769, filed on Aug. 30, 2007.

(30) Foreign Application Priority Data

Aug. 30, 2007 (DK) .......................... PA 2007 01237
Sep. 21, 2007 (WO) ................ PCT/EP2007/060056

(51) Int. Cl.
*H04L 9/32* (2006.01)
*H04L 29/06* (2006.01)
(Continued)

(52) U.S. Cl.
CPC ................ *H04L 63/12* (2013.01); *G06F 21/55* (2013.01); *G06F 21/554* (2013.01);
(Continued)

(58) Field of Classification Search
CPC ....... G06F 21/55; G06F 21/554; G06F 21/64; G06F 21/606; H04L 63/12; H04L 9/3281; H04L 63/0428; H04L 63/0823; H04L 9/32; H04L 63/08

USPC .......................................................... 713/170
See application file for complete search history.

(56) References Cited

U.S. PATENT DOCUMENTS 6,006,328 A 12/1999 Drake
6,018,801 A 1/2000 Palage et al.
(Continued)

FOREIGN PATENT DOCUMENTS

CA 2513035 12/2006
EP 1513113 3/2005
(Continued)

OTHER PUBLICATIONS

International Preliminary Report on Patentability & Written Opinion dated Jun. 25, 2009 for corresponding International Application No. PCT/EP2007/063983.

(Continued)

*Primary Examiner* — Andy Rao
*Assistant Examiner* — Shan Elahi
(74) *Attorney, Agent, or Firm* — Harness, Dickey & Pierce, P.L.C.

(57) ABSTRACT

A method for protecting a digital document and user data typed into a digital document is presented. The method comprises computation of an authentication tag when the document is sent from a server. A similar authentication tag is computed when the document is shown on a client. When another document referenced in the document is requested by the client from the server, the authentication tag computed by the client is attached to the request for that other document. The server receiving the request compares the authentication tag it computed with the one it received to verify if the request came from an authentic copy of the document. The method is suitable for protection of online banking, online investment, online shopping, and other electronic applications.

29 Claims, 7 Drawing Sheets

(51) Int. Cl.
*G06F 21/55* (2013.01)
*G06F 21/60* (2013.01)
*G06F 21/64* (2013.01)

(52) U.S. Cl.
CPC .............. *G06F 21/606* (2013.01); *G06F 21/64* (2013.01); *G06F 2221/2119* (2013.01)
USPC 713/170; 713/169; 713/171; 713/172 CPC

(56) References Cited

U.S. PATENT DOCUMENTS

| | | | |
|---|---|---|---|
| 6,363,479 B1* | 3/2002 | Godfrey et al. | 713/160 |
| 6,601,172 B1* | 7/2003 | Epstein | 713/178 |
| 6,668,325 B1 | 12/2003 | Collberg et al. | |
| 6,735,694 B1* | 5/2004 | Berstis et al. | 713/178 |
| 7,100,049 B2 | 8/2006 | Gasparini et al. | |
| 8,181,262 B2* | 5/2012 | Cooper et al. | 726/28 |
| 2001/0037454 A1* | 11/2001 | Botti et al. | 713/176 |
| 2002/0016927 A1* | 2/2002 | Nagata et al. | 713/201 |
| 2002/0144110 A1 | 10/2002 | Ramanathan | |
| 2003/0217137 A1* | 11/2003 | Roese et al. | 709/223 |
| 2003/0218629 A1* | 11/2003 | Terashima et al. | 345/738 |
| 2004/0010684 A1 | 1/2004 | Douglas | |
| 2004/0071164 A1* | 4/2004 | Baum | 370/469 |
| 2004/0111640 A1* | 6/2004 | Baum | 713/201 |
| 2004/0203846 A1* | 10/2004 | Caronni et al. | 455/456.1 |
| 2004/0205335 A1* | 10/2004 | Park | 713/155 |
| 2004/0243852 A1 | 12/2004 | Rosenstein | |
| 2005/0036616 A1* | 2/2005 | Huang et al. | 380/255 |
| 2005/0041675 A1* | 2/2005 | Trostle et al. | 370/401 |
| 2005/0160273 A1* | 7/2005 | Oishi | 713/180 |
| 2005/0188214 A1 | 8/2005 | Worley et al. | |
| 2007/0022469 A1* | 1/2007 | Cooper et al. | 726/3 |
| 2007/0160198 A1* | 7/2007 | Orsini et al. | 380/28 |
| 2008/0301051 A1 | 12/2008 | Stahlberg | |
| 2009/0077383 A1 | 3/2009 | De Monseignat et al. | |

FOREIGN PATENT DOCUMENTS

| | | |
|---|---|---|
| WO | WO 99/18490 | 4/1999 |
| WO | WO 99/43167 | 8/1999 |
| WO | WO 02/082716 | 10/2002 |

OTHER PUBLICATIONS

Standard Search Report dated Oct. 2, 2007 for corresponding European application.

Standard Search Report dated Jul. 23, 2007 for corresponding European application.

Mihir Bellare et al. "Keying Hash Functions for Message Authentication," *Int'l Assoc for Crypt. Res.*, 16th Ann. Int'l Crypt. Conf., Santa Barbara, CA, XP 000626584 pp. 1-15 (Aug. 18-22, 2006).

Ravi Ganesan. "Augmenting Kerberos with Public Key Cryptography," (Aug. 6, 2002).

Edward L. Witzke et al. "Key Management for Large Scale End-to-End Encryption," (Aug. 6, 2002).

Jayamsakthi Shanmugam et al. "A solution to block Cross Site Scripting ulnerabilites based on Service Oriented Architecture," (Jul. 23, 2007).

* cited by examiner

DIGITAL DATA AUTHENTICATION

This application is a continuation application of U.S. patent application Ser. No. 12/448,249, which is a National Phase entry of PCT Application No. PCT/EP2007/063983, filed on Dec. 14, 2007, which claims priority under 35 U.S.C. §119(e), 120 and 365(c) to U.S. Provisional Application No. 60/874,955, filed on Dec. 15, 2006, U.S. Provisional Application No. 60/907,465, filed on Apr. 3, 2007, U.S. Provisional Application No. 60/935,769, filed on Aug. 30, 2007, Danish Patent Application No. PA200701237, filed on Aug. 30, 2007, in the Danish Intellectual Property Office, and European Patent Application No. PCT/EP2007/060056, filed on Sep. 21, 2007, in the European Intellectual Property Office.

FIELD OF THE INVENTION

The method and apparatus of the present invention relate generally to securing computer programs, network communication, and stored data against attacks.

BACKGROUND OF THE INVENTION

The increase in electronic commerce in recent years has also led to a rapid growth in computer crime. In particular, financial transactions over computer networks proved to be a major target of attacks, where the attackers are using a variety of techniques such as phishing. As an example, at the time of this writing, almost all major banks worldwide are under attack by various forms of identity theft, and while the financial losses are significant, the more important danger is that of bank users losing confidence in online banking.

It has become clear that the old recipes for protecting client-server connections over insecure networks (as e.g. user passwords or their combination with one-time passwords) no longer provide the necessary level of security. Attackers use a combination of more and more advanced techniques, such as man-in-the-middle attacks, phishing, DNS spoofing, and malware (e.g. viruses and Trojan horses). In this context, new protection techniques are required to secure financial online transactions.

The present invention can prevent most man-in-the-middle, phishing, and malware attacks on for example net bank applications, online investment applications, and online entertainment applications.

NOMENCLATURE

Some of the terms used in this document are described in the following:

Argument: An input, e.g. to a function, a server, or a HTTP request

Asymmetric key: A cryptographic key to be used in an asymmetric algorithm.

Asymmetric algorithm: An algorithm using one key for encryption and another key for decryption or an algorithm using one key for signing and another key for verifying the signature, Can for example be RSA or ECC.

Authentication tag: See tag.

Block cipher: An encryption/decryption algorithm operating on plaintext/ciphertext blocks of fixed length. Can for example be AES or 3DES. Also see [Sc96] pp. 4 and 189-211.

Cipher: See encryption/decryption algorithm.

Ciphertext: An encrypted string.

Client application: A computer program that can connect to a server application. An application being a client towards a server might also be a server towards another client.

Composition: In this text, the composition of a function or algorithm that is different for each copy denotes the functionality of the specific function or algorithm in a specific copy. For example, one composition can be $f(x)=3x+4$ and another composition can be $f(x)=7x-2$.

Computer-executable program file: For example an .exe, .dll, .ocx, .class, or .jar file.

Copy: Two different copies of a computer program have the same overall features but may have different internal functions, e.g. key generators.

Cryptographic algorithm/function: In this text, this denotes a mathematical function (or its implementation) that is used for communication or storage in the presence of an adversary. Examples include encryption/decryption algorithms, message authentication codes (MAC), or hash functions.

Digital document: Includes HTML, XHTML, XML, PDF, word process files, and spread sheet files.

Encryption/decryption algorithm: An encryption algorithm encodes data under a key such that it cannot be distinguished from random data. A decryption algorithm reverses the encryption algorithm and restores the original data, using a key. Can e.g. be a block cipher, a stream cipher or an asymmetric cipher. Also see [Sc96] pp. 1-5.

Hash function: A function that takes a string of any length as input and returns a string of fixed length as output. The function achieves a strong mixing of the string, and its output can be used as a short identifier for the input. Examples are collision resistant hash functions, one-way functions, or any family of pseudo-random functions). Also see [Sc96] pp. 30-31.

IV: Initialization vector. A publicly known string that is used to avoid that a cryptographic algorithm always produces the same output.

Key: A string usually known only by some parties. Keys are used as input to cryptographic algorithms. Also see [Sc96] p. 3.

MAC function: A message authentication code (or MAC) takes a key and a data string as input and produces an authentication tag as output. If the key is a secret shared by sender and receiver and if the tag is appended to the message, the receiver can re-run the MAC to verify that the data has not modified since it was written. Also see [Sc96] p. 31.

One-time password (OTP) or one-time key (OTK): A key or password used only once, e.g. for authenticating a user.

Plaintext: An un-encrypted string.

PRNG: A pseudo-random number generator (or PRNG) takes a seed as input and generates an output string of arbitrary length. If the key is not known, the output string cannot be distinguished from random. Also see "pseudorandom sequence generator" in [Sc96] pp. 44-45.

Request: A digital document is requested from one party from another party. Includes HTTP requests, e.g. using the GET or POST methods.

Seed: Input to a PRNG.

Server application: A computer program that can receive connections from a client application and/or provide services to a client application.

Server: Software (i.e. server application), hardware, or combination thereof that can receive connections from a client application and/or provide services to a client application.

Source code: For example the content of a .java, .c, .cpp, .h, or .pas file.

Stream cipher: An encryption/decryption algorithm operating on streams of plaintext or ciphertext. Also see [Sc96] pp. 4, 189, and 197-199.
String: A block of data. Can be a text string (a set of characters) or a binary string (a set of bits).
Symmetric key: A cryptographic key to be used in a symmetric algorithm.
Symmetric algorithm: An algorithm using the same key for both encryption and decryption or for both creating an authentication tag and verifying an authentication tag. Can for example be a block cipher, a stream cipher, or a MAC function,
Tag: Output of a MAC function.
Time stamp: A string containing information about date and/or time of day.
Version: Two different versions of a computer program have different features. Usually, a new version has more or better features than the previous version.
XOR: Binary operation often denoted by a $\oplus$. $0 \oplus 0 = 0$, $0 \oplus 1 = 1$, $1 \oplus 0 = 1$, and $1 \oplus 1 = 0$.
[Sc96]: Bruce Schneier, Applied Cryptography, John Wiley & Sons, 1996.

SUMMARY OF THE INVENTION

In a first aspect the present invention provides a method of verifying if a request ($R'_2$) for a second digital document ($D_2$) origins from a reference within an authentic copy of a first digital document ($D_1$), the method comprising the steps of
  a first party ($P_1$) sends a first digital document ($D_1$) to a second party ($P_2$);
  $P_2$ receives a possibly tampered version ($D'_1$) of $D_1$;
  $P_1$ computes a first authentication tag ($TD_1$) on at least a part of $D_1$;
  $P_2$ computes a second authentication tag ($TD'_1$) on at least a part of $D'_1$;
  $P_2$ sends a request ($R_2$) for a second digital document ($D_2$) referenced in $D'_1$ to $P_1$, the request ($R_2$) including $TD'_1$;
  $P_1$ receives a possibly tampered version ($R'_2$) of $R_2$ and deducts $T'D'_1$;
  $P_1$ considers $R'_2$ to origin from an authentic $D_1$ if $T'D'_1$ is equal to $TD_1$.

It may thus be ensured that the request $R_2$ origins from an authentic document ($D_1$). Hence, an unauthorized modification to $D_1$ which could e.g. occur due to forgery of a net-banking web page may be detected. Consequently, the present invention allows improved security in a variety of data transmission applications, in particular Internet transmission of digital data, such as in net-banking systems, Internet shopping sites, public authority web interfaces, Internet-based or Intranet-based order delivery systems, etc. The verification of the authenticity of $D_1$ may allow the first party ($P_1$) to detect modification of $D_1$ while $D_1$ was sent from $P_1$ to $P_2$ as well as modification of $D_1$ while $D_1$ was stored on $P_2$. Modification of $D_1$ while stored on $P_2$ may include modification of $D_1$ while it is being shown in the graphical user interface of $P_2$.

The request $R_2$ is typically initiated by an Internet browser, i.e. $R_2$ typically occurs in the form of an http request or an https request. The digital documents $D_1$ and $D_2$ may typically include web pages to be displayed on in a user's web browser. The first party $P_1$ is normally a web server or a proxy server, and the second party $P_2$ is normally a web browser running at a client's computer.

In this document, the terms "web server", "proxy server", and "web browser" may cover the software providing the functionality and/or the hardware on which this software is executed (e.g. a server running web server software or proxy server software or a PC running web browser software). The present invention can e.g. be embedded directly into the software of a web server, a proxy server, and/or a web browser or be implemented as software modules to be loaded at runtime into a proxy server, a web server, and/or a web browser.

The method according to the invention may further be adapted to verify if digital data ($A_2$) attached to $R_2$ is authentic. In this case $D'_1$ may contain a reference to said digital document ($D_2$) where a request for that document ($D_2$) includes attached digital data. In such an embodiment, the method may further comprise the additional steps of
  $P_2$ collects the digital data ($A_2$) to be included in a request for $D_2$;
  $P_2$ computes a third authentication tag ($TA_2$) on at least a part of $D'_2$;
  including $A_2$ and $TA_2$ in $R_2$ sent from $P_2$;
  $P_1$ also deducts $A'_2$, $T'A_2$ from $R'_2$;
  $P_1$ computes a fourth authentication tag ($TA'_2$) on at least a part of $A'_2$;
  $P_1$ considers $A'_2$ as authentic if $T'A_2$ is equal to $TA'_2$.

These steps allow $P_1$ to verify if the digital data $A_2$ is authentic and to take appropriate action if not.

$TD_1$ may be stored on $P_1$ from a first point in time when $D_1$ is sent to $P_2$ to a second point in time when $TD_1$ is compared with $T'D'_1$. Preferably, the transmission of $D_1$ from $P_1$ does not include the authentication tag ($TD_1$). This allows the first party (e.g. server) $P_1$ to verify the authenticity of $D_1$ or the copy of $D_1$ shown to the user when the server receives the request $R_2$. Thereby, authentication may take place at a server so as to allow, e.g. authentication in net-banking systems to run in safe environments, i.e. at a bank's site.

In another embodiment, $TD_1$ is inserted into $D_1$ in encrypted or authenticated form by $P_1$. The encrypted or authenticated $TD_1$ may be included in $R_2$ by $P_2$, and the encrypted or authenticated $TD_1$ deducted from $R'_2$ is decrypted or verified by $P_2$ before being compared to $T'D'_1$. This allows for a stateless server, as no table of authentication tags needs to be maintained.

In order to protect $TD'_1$ or $TA_2$ against tampering, $TD'_1$ and/or $TA_2$ may be encrypted or authenticated by $P_2$ and transmitted in encrypted or authenticated form to $P_1$.

In the method according to the present invention, $P_1$ may refuse to send $D_2$ to $P_2$ if at least one of $D'_2$ and $A'_2$ is not authentic.

At least one of $TD'_1$ and $TA_2$ may be computed more than once by $P_2$, so that the authentication tags may be computed not only upon download, but also repeatedly thereafter, while the document is being displayed.

Computation of the authentication tags $TD'_1$ and $TA_2$ may be triggered by at least one of the following events:
  the document is loaded,
  the document is shown,
  a link in the document is activated,
  script code in the document is activated,
  an amount of time has elapsed,
  a change has occurred to $D_1$, and
  a change has occurred to user data entered into $D_1$.

At least two of said authentication tags may be computed on at least two different parts of $D'_1$ or an at least two different parts of $A_2$. Preferably, rules may exist to define which parts of $D'_1$ or $A_2$ are to be used for computing the authentication tags depending on which event has triggered the computation. For example, some events may result in an authentication tag being computed based on relatively large portions of the documents, whereas other events may result in an authentication tag being computed based on relatively small portions of the documents.

The two different parts, upon which the authentication tags are computed, may be overlapping. For example, one may be a subset of the other.

At least one authentication tag may be calculated by means of at least one of the following methods:
- a hash function,
- a MAC function, and
- an asymmetric digital signature algorithm.

An authentication tag that authenticates at least some of the data in $D_1$ may also be provided in $D_1$ itself in order to allow $P_2$ to verify the authenticity of $D'_1$ or a part thereof using said authentication tag.

A computer program may be embedded into $D_1$ or referenced in $D_1$, the computer program being adapted to calculate at least some of the authentication tags to be included in $R_2$.

At least one of said authentication tags may be computed by means of a computer program, wherein each user or group of users uses a different computer-executable program file to run the computer program. This allows unique security features, e.g. unique identifiers or cryptographic keys, to be embedded into the individual executable files. In one particular embodiment, the computer-executable program file is fabricated from a source code, the computer program including, in said computer-executable program file, at least one embedded value or means for generating at least one value, said value being uniquely selected or uniquely generated for the computer-executable program file, whereby the computer-executable program file is capable of carrying out instructions provided by the source code and of generating a unique output, which depends from said uniquely selected or uniquely generated value.

It will hence be appreciated that unique copies of a computer program (computer-executable program file) may be fabricated, i.e. copies which are all capable of carrying out the same instructions to perform identical operations in terms of overall functionality, but which all differ from each other in that each copy is capable of generating a unique output. It will be understood that, in embodiments of the method according to the present invention, the at least one value may be embedded as a static value. Alternatively, the at least one value may be generatable by the means for generating the value. The means for generating the value may be generated at the stage of fabricating the computer-executable program files. The means for generating the value are preferably adapted to generate the value at runtime of the computer-executable program files. The unique output is normally generated at runtime of the computer-executable program files, but may also be embedded as a static value, which is generated at the fabrication stage.

The embedded means for generating at least one value may comprise at least one extractor subfunction. The extractor subfunction(s) may be uniquely selected for each computer-executable program file.

$P_1$ may replace at least one reference in $D_1$ with a substitute reference. The substitute reference is preferably unique for $D_1$ or for a specific copy of $D_1$, and $P_1$ may maintain a table of substitute references such that it can identify which digital document to send to $P_2$ when $P_2$ requests the substitute referenced digital document.

A computer program running on the computer of $P_2$ may oversee relevant actions on that computer in order to detect unusual behavior. Unusual behavior may for example consist in data being typed or changed faster than possible by humans or data being typed in a non-visible window. Generally, the data recorded in order to detect unusual behavior may include at least one of:
- timing of input data received from the user,
- value of input data received from the user, and
- visibility of data to be presented to the user.

The computer program running on the computer of $P_2$ that oversees relevant actions may also compute at least one of the authentication tags to be included in $R_2$. Hence, the system may be less vulnerable to hacking attacks, as a hacker cannot attack one part of the system without affecting the other.

$P_2$ may send a report to $P_1$ on detected behavior on $P_2$ to allow $P_1$ (e.g. a server) to react accordingly. $P_1$ can e.g. use this information in a fraud detection system where the fraud detection system determines if a financial transaction ordered by the user of the computer of $P_2$ should be processed or rejected.

The computer program running on the computer of $P_2$ that oversees relevant actions may also maintain a copy of the last accepted state of the user data typed into $D'_1$. Hence, if suspicious behavior is detected while the user data typed into is edited, the computer program can bring the user data back to the state it had before the suspicious behavior was detected. If the user data in $D'_1$ was edited in a non-suspicious manner, the copy of the last accepted state is updated accordingly. In this way, the computer program running on the computer of $P_2$ can undo suspicious changes made to the user data in $D'_1$.

Rules may define constraints on the content of those parts of $D'_1$ not included in calculating $TD'_1$. For example, parts of $D'_1$ which are intermittently changed are normally not included in computing the authentication tags. The rules may e.g. define that at least some of those parts of $D'_1$ not included in calculating $TD'_1$ may only be displayed in predetermined parts of the graphical user interface of $P_2$. The rules may be included in $D_1$ or downloaded from $P_1$.

$P_1$ may embed a value into $D_1$, and at least one authentication tag computed by $P_2$ may depend on that embedded value. The embedded value is preferably chose randomly and changes for every copy of $D_1$ served by $P_1$. Hence, a previously computed authentication tag may not be re-used. It will hence be appreciated that the embedded value from $D'_1$ may be unique for each copy of $D_1$ sent from $P_1$.

Authenticate Documents

In one embodiment of the present invention, a second party sends a first request for a first digital document to a first party. The first party sends the first digital document to the second party. The second party receives the first digital document which has possibly been tampered with on the way between the first and second party. The first party computes an authentication tag on at least a part of the first digital document. The second party computes an authentication tag on at least a part of the first digital document. The second party sends a second request to the first party for a second digital document referred in the first digital document. This second request includes the authentication tag computed on the first digital document by the second party. The first party receives the second request and extracts the authentication tag computed on the first digital document by the second party. If the two authentication tags computed by the two parties are equal, the first party considers the first digital document received by the second party as authentic.

In one embodiment of the present invention, a first party sends a first digital document to a second party. The first digital document contains a reference to a second digital document where a request for that digital document should include digital data (e.g. arguments to a web server). The second server prepares the included data and computes a first authentication tag on at least a part of this prepared data. The second party sends a request to the first party; the request includes the prepared data and the authentication tag. The request may be tampered with on the way between the first and second party. The first party extracts the prepared data and the authentication tag and verifies if the authentication tag is valid for the prepared data. If it is, the received prepared data is authentic.

In one embodiment of the present invention, a first party sends a first digital document to a second party. The second party receives the first digital document which has possibly been tampered with on the way from the first party to the second party. The second party computes a first authentication tag on the first digital document. The first digital document contains a reference to a second digital document. A request for the second document should include digital data. The second party prepares the digital data to include in the request and computes a second authentication tag on at least a part of this data. The second party sends a request for the second digital document; the request includes the prepared data, the first authentication tag, and the second authentication tag. The request may be tampered with on the way from the second party to the first party. The first party extracts the prepared data and the two authentication tags and verifies if the first authentication tag has been computed from data equal to the first digital document and verifies if the second authentication tag has been computed from data equal to the prepared data.

In one embodiment of the present invention, only a part of the first document is included in calculating the authentication tag. Information about what to include in the computation can e.g. be stored in the first digital document or be downloaded from the first party.

In one embodiment of the present invention, the first party is a web server. This web server can for example communicate with the second party using the HTTP 1.0 or HTTP 1.1 protocols or later versions thereof or using a version of the HTTPS protocol.

In one embodiment of the present invention, the first party is a HTTP proxy server. This proxy server gets the digital documents from a web server. In one embodiment of the present invention, one proxy server provides protected access to several web servers, i.e. several web servers are located behind one proxy server.

In one embodiment of the present invention, the second party is a web browser. This web browser can for example communicate with the first party using the HTTP 1.0 or HTTP 1.1 protocols or later versions thereof or using a version of the HTTPS protocol.

In one embodiment of the present invention, the proxy server bypasses its security features for some users, e.g. users with specific IP numbers or users using specific browsers or operating systems. This feature can be beneficial e.g. if some user's web browsers are not capable of computing the authentication tags.

In one embodiment of the present invention, the first party computes the authentication tag on one or more document once and subsequently uses this pre-computed authentication tag to verify the authenticity of the one or more documents. This allows the first party to verify the authenticity without computing authentication tags for each document sent.

In one embodiment of the present invention, the second party computes the authentication tag on the first digital document and/or the prepared data more than once. The computation can for example be triggered by an event, e.g. the document is loaded, the document is shown, a link in the document is activated, script code in the document is activated, an amount of time has elapsed, the first document has been changed, or the user has entered data into the document.

In one embodiment of the present invention, more than one authentication tag is computed; the tags are computed on different parts of the digital documents (these parts may overlap).

In one embodiment of the present invention, the computer program computing the authentication tags on at the second party are referenced to by the digital document or included in the digital document.

In one embodiment of the present invention, each user or group of users uses a different computer-executable program file to compute the authentication tags.

Solutions for protecting communication over the Internet between two computers are known from the prior art. For example the SSL (Secure Socket Layer) protocol (later versions are named TLS) and the HTTPS (Hyper Text Transfer Protocol Secure) protocol. HTTPS is standard HTTP sent over a SSL or TLS protected communication link. The SSL, TLS, and HTTPS protocols protect data (e.g. a document) when being sent from one computer to another. Before the data is sent from the first computer, an authentication tag is computed. This authentication tag is appended to the data to be sent. When the data is received on the second computer, the appended authentication tag is extracted and the receiver computes an authentication tag on the data to be authenticated. If this authentication tag matches the one extracted, the data is considered authentic. In one aspect of the present invention, authentication tags are also computed on the first computer as well as on the second computer. But in this aspect, the first computer does not send the authentication tag to be verified by the second party. Instead, the first party stores the computed authentication tag and the second party sends the authentication tag it computed back to the first party for verification. Also, SSL, TLS, and HTTPS aim at protecting data in transit. Some embodiments of the present invention further aim at protecting data when displayed on a user's computer.

When verifying if a request for a digital document is authentic, the request is usually sent from a client computer and received by a server computer. The client computer can for example run an Internet browser. The server computer can for example run a web server or a web proxy. Usually, there are several client computers for each server computer.

In one embodiment of the present invention, at least one authentication tag is computed several times on the client computer. The at least one authentication tag can for example be computed each time a certain time interval has elapsed (for example 100 milliseconds) or when an event occurs in the document (for example when the document is changed or data is typed into forms in the document).

In one embodiment of the present invention, the user's actions are monitored in order to detect suspicious (i.e. unusual) behavior. When the party where user behavior is monitored requests a document from another party, where the requested document is referenced from a document being viewed on the user's computer, it reports to the second party if suspicious behavior was detected and/or a degree of suspiciousness of the behavior when the user viewed and/or typed data into the document containing the reference for the requested document.

In one embodiment of the present invention, one or more client computers communicate with a web proxy server that is positioned in front of a web server. Software on the client's computer monitors the user's actions and reports suspicious behavior to the web proxy server. The web proxy server may forward these reports to the web server. The forwarded reports may be processed by the web proxy server before being forwarded. Reports may e.g. be sent from the client to the proxy and/or from the proxy to the web server either only when suspicious behavior has been detected or for all transactions.

In one embodiment of the present invention, when computing an authentication tag on a document, parts of the content of the document are not included in the computations. In one embodiment of the present invention, which parts to exclude are defined by rules. These rules can e.g. be included in the document or downloaded separately from a server. In one embodiment of the present invention, rules can define constraints on the appearance of the parts not included in the signature. These constraints on the appearance can for example define that parts of the document excluded from the computation of the authentication tag may only be displayed in predetermined parts of the graphical user interface.

In one embodiment of the present invention, a document is sent from a first party to a second party. This document contains an embedded value imbedded into the document by the first party. This embedded value may be randomly selected for that document. The embedded value is used by the second party when computing authentication tags. This method can allow the first party to ensure that the authentication tags received from the second party are fresh.

In one embodiment of the present invention, a computer program running on the second party's computer provides session protection, e.g. by generating a random value when a session is set up and using this value to identify the session towards the first party for all subsequent communication between the first party and the second party. Such a session protection mechanism can for example set up a shared secret as follows:

The second party (e.g. a web browser) receives a digital document from the first party. When this document is shown in the second party's graphical user interface, a pseudo-random value is generated.

When the next request is sent to the first party (e.g. a web server or a proxy server), the pseudo-random value is attached in encrypted and authenticated form.

Such a shared secret (a random value known only by the first party and the second party) can subsequently be e.g. used by the second party to identify itself and its session towards the first party. A protocol for such identification can for example comprise the following steps:

When digital document are sent from the first party to the second party, the first party attaches a pseudo-random value as challenge.

This challenge is concatenated with the shared secret and the resulting string is processed by a hash function.

The output of the hash function is attached to a request sent to the first party.

The first party performs a computation similar to the one carried out by the first party in order to obtain the same output from the hash function.

If the output of the hash function received to the first party if equal to the one computed by the first party, the request is considered to origin from the session.

Such session protection schemes can e.g. be used to tie requests for digital documents together with a preceding user login.

Key Generator

In one embodiment of the present invention, a key extractor is embedded into a computer-executable program file. This key extractor may take an extractor IV as input and generates an extracted key as output (see left part of FIG. 7). The extracted keys can for example be used as key in cryptographic functions.

In one embodiment of the present invention, computer-executable program files are generated in a way such that one or more unique strings are embedded into each copy. These one or more unique strings can for example be used as parameters to a key extractor in order to generate keys that are unique for each copy, as serial numbers, or as keys in cryptographic functions.

In one embodiment of the present invention, the extractor function always returns a constant string. Thus, the extracted key is a constant.

In one embodiment of the present invention, the extractor function is build as shown in FIG. 8:

The function has a number of inner state words (their initial values are $W_1$, $W_2$, $W_3$, and $W_4$ in the figure).

A number of extractor subfunctions ($F_1$, $F_2$, ... $F_n$ in the figure) are manipulating the inner state words.

The resulting inner state words are manipulated (the L function in the figure) in order to generate the extracted key.

Each extractor subfunctions can take one or more inner state words as input and can change the value of one or more inner state words. One or more of the initial values of the inner state words ($W_1$, $W_2$, $W_3$, and $W_4$ in the figure) may be derived from an extractor IV. There can be one or more inner state words. One or more of the extractor subfunctions may depend on an extractor IV or value derived thereof. One or more of the extractor subfunctions may depend on a constant value.

The function combining the inner state words into the extracted key (the L function in FIG. 8) can for example consist of one or more of:

A concatenation of the inner state words.

A hash function

A MAC function

An encryption function; e.g. one block cipher operation for each state words using the state word as key, forwarding the output (ciphertext) to the next as input (plaintext). The output of the last operation is the extracted key.

In one embodiment of the present invention, the extractor function is build as shown in FIG. 9:

Initial values of the inner state words are generated from the extractor IV by a function (the J function in the figure).

A number of extractor subfunctions are manipulating the inner state words ($F_1$, $F_2$, ... $F_n$ in the figure).

Parameters for the extractor subfunctions are generated from the extractor IV by a function (illustrated by the K function in the figure).

Constants for the extractor subfunctions ($C_1$, $C_2$, ... $C_n$ in the figure) are embedded in the computer-executable program file.

The resulting inner state words are processed by a function to generate the extracted key (the L function in the figure).

Each extractor subfunction can take one or more inner state words as input and can change the value of one or more inner state words.

In one embodiment of the present invention, the extractor subfunctions produces a balanced output, are non-linear, and/or are correlation-resistant.

In one embodiment of the present invention, the extractor subfunctions relies on bijective function (e.g. addition, subtraction, xor, or rotating) or on table lookups (e.g. the s-boxes from the encryption algorithm AES).

In one embodiment of the present invention, extractor functions have jump instructions. These jump instructions may for example be conditional. The conditional jumps can for example depend on one or more of:
- one or more inner state words,
- the extractor IV, and
- a constant value.

In one embodiment of the present invention, an extracted key or one or more unique strings are used as input to a blender function (see right part of FIG. 7). This blender function also takes a blender IV as input and generates a purpose key as output.

In one embodiment of the present invention, the output from a key generator (an extracted key) is used as input to a blender function (see FIG. 7).

In one embodiment of the present invention, a unique key generator function is embedded into each computer-executable program file. The extractor function is or is not different for each copy. The blender function is or is not different for each copy.

In one embodiment of the present invention, a blender function relies on cryptographic functions to generate the purpose key from its inputs.

In one embodiment of the present invention, a blender function concatenates the blender IV and the extracted key and processes the resulting string (or a string derived thereof) by a hash function. The output from the hash function or a string derived thereof is used as purpose key.

In one embodiment of the present invention, a blender function uses the blender IV (or a string derived thereof) as message and the extracted key (or a string derived thereof) as key to a MAC function. The output of the MAC function (or a string derived thereof) is used as purpose key.

In one embodiment of the present invention, a blender function uses the blender IV (or a string derived thereof) as plaintext and the extracted key (or a string derived thereof) as key to a block cipher. The output of the block cipher (or a string derived thereof) is used as purpose key.

In one embodiment of the present invention, a blender function uses the blender IV (or a string derived thereof) as key and the extracted key (or a string derived thereof) as plaintext to a block cipher. The output of the block cipher (or a string derived thereof) is used as purpose key.

In one embodiment of the present invention, the key generator consists of a constant string that directly or after manipulation is used as key for a block cipher. The generator IV (or a string derived thereof) is used as plaintext and the cipher text output (or a string derived from it) is used purpose key.

In one embodiment of the present invention, the key generator consists of a constant string that is concatenated with the generator IV or by other means combined with the generator IV. The resulting string is hashed and the resulting string (or something derived from it) is used as purpose key.

In one embodiment of the present invention, an extractor IV and/or a blender IV are derived from a key generator IV.

In one embodiment of the present invention, a key generator IV is derived from a counter value.

In one embodiment of the present invention, a key generator IV is derived from a time stamp.

In one embodiment of the present invention, several purpose keys are generated from one key generator IV. This can be achieved in several ways, for example:
- By manipulating the key generator IV before calling the key generator.
- By manipulating the extractor IV.
- By manipulating the blender IV.
- By manipulating the extracted key, e.g. appending a string to it.
- By manipulating the purpose key returned by the key generator.
- By manipulating the purpose key returned by the key generator and sending the manipulated key through a cryptographic function, e.g. a hash function.
- By using different key generator functions (completely different or with just one or more components different).

In one embodiment of the present invention, a purpose key is used as at least one of:
- An encryption key.
- A decryption key.
- An authentication key.
- An authentication value (i.e. a value that can be used to confirm that a computer-executable program file contains a given key generator).

In one embodiment of the present invention, data from the user, data about the user, or data from something in the user's possession is included in the key generation process. In this way, user authentication can be embedded into the key generation. Data from the user can for example be a password, an account number, or a user name. Data about the user can for example be biometric data. Data from something in the user's possession can for example be a one-time password or a short-time password (e.g. from a password generator device) or a key stored in a file on a devices (e.g. a hard disk or a USB memory stick).

In one embodiment of the present invention, a computer-executable program file has several key generators.

In one embodiment of the present invention, one computer program has a key generator embedded into its program code. Another computer program has knowledge about the composition of the key generator and can, based on this knowledge, reproduce the key generator's functionality and thus its output.

In one embodiment of the present invention, the process of generating a computer-executable program file with a key generator comprises generating a random or unique seed string. This seed string is expanded to a longer string using a PRNG. This string (or something derived from it) is divided into substrings used for constructing the extractor function. These substrings can for example choose which extractor subfunctions to use, on which inner state words they operate, or be used as constants given to the subfunctions (e.g. $C_1$, $C_2$, ... $C_n$ in FIG. 9). If all non-static information needed to construct an extractor function is derived from the expanded string (and thus from the seed string), knowledge of the seed string is enough to reproduce the complete key generator.

In one embodiment of the present invention, computer-executable program files with unique key generators are given unique serial numbers. This serial number can for example be used to look up the copy's PRNG seed in a table or a database. If a party knows the PRNG seeds used to generate a program with a given serial number, that party can reproduce the key generator and thus produce the same keys as the computer-executable program file. The serial numbers can for example be consecutive, random, or encrypted consecutive numbers.

In one embodiment of the present invention, a computer-executable program file with a key generator is embedded or included in another file, for example a java archive file (.jar file), an archive file (e.g. a .tar file), a compressed file (e.g. a .gz file), a compressed archive file (e.g. a .zip file), or an install file.

Client and Server

In one embodiment of the present invention, a client program has a key generator embedded into its program code and a server has knowledge about the composition of the key generator. Thus, the client program and the server program can generate the same purpose key given the same key generator IV.

In one embodiment of the present invention, client programs with embedded key generators are communicating with one or more server programs. FIG. 10 shows an example. The client program generator is a program that can generate client programs with unique embedded key generators. For each client program it has generated, it stores the generated program in a program file database and the program's serial number and PRNG seed in a seed database. The client program can for example be distributed to users via a web server or on optical media via retail stores or by mail. When the user uses the client program, the client program can communicate with a transaction server using purpose keys generated by the key generator if the transaction server has access to the seed database, since it using the program's serial number (sent from the client program to the server) can find the client program's seed in the seed database and using the seed can reproduce the client program's key generator.

In one embodiment of the present invention, client programs with embedded key generators are communicating with one or more server programs. The client program generator stores the generated client programs in a program file database and stores the program's serial number with a program containing only the key generator as embedded in the generated client program in a key generator database. When the user uses the client program, the client program can communicate with a transaction server using keys generated by the key generator if the transaction server has access to the key generator database, since the key generator program can generate the same keys as the client program's key generator.

In one embodiment of the present invention, client programs with embedded key generators are communicating with one or more server programs. The client program generator generates client programs with unique key generators on-demand when a user requests a program. When a client program is generated, the serial number and PRNG seed is stored in a seed database. Alternatively, serial number and key generator is stored in a key generator database.

In one embodiment of the present invention, HTTP caching e.g. by proxy servers is prevented by giving unique names to each computer-executable program file, e.g. by adding an argument string (e.g. "?rand_id=0x5E9A005F") to the file name URL, where the hexadecimal number is unique for each user (e.g. stored on user PC in cookie) or unique in general.

Obfuscation

In one embodiment of the present invention, the generated computer-executable program file or a part thereof is obfuscated. This obfuscation may make it harder to derive information on how the key generator function is build and/or to make it harder to reverse-engineer the program in general. Furthermore, the obfuscation may make it harder to produce a computer program that can automatically patch (i.e. modify) the computer-executable program file.

The obfuscation process can for example comprise one or more of the following techniques:

Replacing a program instruction or a set of program instructions with another program instruction or set of program instructions with equivalent functionality.
Reallocate registers, i.e. change the use of processor or co-processor registers.
Change the order of the program instructions.
Change the order of functions or program instruction blocks.
Change loop structure, e.g. inline functions, add meaningless jumps, or replace loop with post-evaluation of condition with loop with pre-evaluation of condition.
Inserting useless data or program instructions.
Interleaving one or more program sequences.
Reordering of static data.
Reordering of runtime data.
Encryption of program instructions.
Encryption of static data.
Replace constant values with code generating the constant values.
Move static or runtime data between stack, heap, and registers.
Use several stacks.
Use several stack pointers to the same stack.
Make the program code self-modifying.
Mix data with program code.
Rename classes, functions, or variables. (e.g. exported function and variables)
Rename files or modules.

In one embodiment of the present invention, byte code (e.g. Java code) can be obfuscated by removing the structure of the compiled byte code. After normal compilation, source code files (e.g. java files) are compiled into output files (e.g. class files). The output files contain information about the program code's interface etc. A group of output files is often combined in an archive file (e.g. a .jar file). These output files are linked together at runtime. The problem is that all this structure of the compiled code makes the code easier to analyze and reverse-engineer. This structure can, however, be removed by restructuring the code in a way such that functionality from a number of output files is combined into one output file. This may require that the program code can handle some tasks that are normally handled by the system, e.g. assigning and freeing memory, handling stack, and handling error situations.

In one embodiment of the present invention, obfuscation methods are used that confuse debugging tools or disassembler/decompiler tools, e.g. adding program code between functions that is never called but confuses a disassembler to decode the code with wrong alignment or use of software interrupts.

Table with Program Parameters

In one embodiment of the present invention, destination addresses for jump instructions and/or parameters to instructions are read from a table. The table or part thereof might be provided in the computer-executable program file, eventually in encrypted form to be decrypted at runtime. The decryption key used to decrypt the encrypted table entries might be generated by a key generator, read from a file or downloaded from a server. The table or part thereof might be downloaded or updated with records downloaded from a server.

In one embodiment of the present invention, a table as described above is given to a client application to allow it to be executed as part of an anti-piracy scheme. This table can for example be given when the user has registered his copy and/or typed in his copy's serial number. This table can for example be stored on disk in encrypted form when is has been received by the client application.

Check Program Before Fabrication

In one embodiment of the present invention, a source code file or an intermediate file derived from a source code file is evaluated before being processed in order to determine if it meets certain criteria before the source code converted into a computer-executed program file and is equipped with a key generator. These criteria might be defined by the same organization as developed the source code. A description of these criteria might be distributed along with the computer-executable program file.

In one embodiment of the present invention, the criteria used to evaluate a source code file or intermediate file are defines such that the evaluated program cannot export data, access data, create data, or manipulate data in a way not wanted by the entity defining the criteria. A criteria file can be a manifest file as e.g. used in Java.

In one embodiment of the present invention, a criteria file associated to a computer-executable program file is evaluated before the computer program is executed to determine if the criteria meets the policies defined for the computer or environment it is about to be executed on.

Hardware Binding

In one embodiment of the present invention, a computer program collects data that can be used to identify the computer it runs on (also called hardware profile data). This data can for example be any of:
  Brand, type, version, or serial number of hardware components.
  Brand, type, version, or serial number of operating system.
  Brand, type, version, or serial number of hardware drivers.
  Brand, type, version, or serial number of software components.
  Software configuration data.
  Hardware configuration data.
  Identity (e.g. user name or e-mail address) of the user.
  MAC number, IP number, DNS settings, or other network configuration data.

In one embodiment of the present invention, a server application collects data about the computer a client application runs on without involving the client application. This data can for example be any of:
  IP number.
  Brand, type, or version of browser.
  Operating system details.

In one embodiment of the present invention, a server application uses hardware profile data (collected by client program and/or server program) to detect if a client program runs on the correct computer.

In one embodiment of the present invention, hardware profile data collected by a client application is combined in groups of strings. These strings are hashed, and the resulting strings are sent to the server. This can anonymize the user's data but still allow the server application to detect changes in the hardware profile. A string unique for the given user or client application can for example be added to the hardware profile data strings before hashing. This will ensure that even if two users have the same hardware components, the server cannot detect it as the hash strings will be different.

Program Authentication

In one embodiment of the present invention, the generated computer-executable program file can be authenticated to detect if it is authentic. This authentication can for example be performed by the program itself, by another program, or by a hardware device. This authentication can for example be based on a purpose key generated by a key generator.

In one embodiment of the present invention, a purpose key is generated by the key generator from a key generator IV. The program file may be pre-processed by a function. The program file or the pre-processed program file is then processed by a MAC function taking the generated purpose key as its key. The output of the MAC function is the authentication tag used to authenticate the program. The pre-processor might be individual for each program copy.

In one embodiment of the present invention, a method for authenticating the computer-executable program file is to process the file, a part thereof, or something derived thereof by a hash function to obtain a hash value representing the content of the file. Another method is to process several parts of the computer-executable program file or something derived thereof to obtain several hash values. These parts may overlap and parts may be left out. This processing might be individual for each copy of the computer-executable program file. Instead of hash functions, other cryptographic functions, e.g. MAC functions can be used to obtain a value with similar properties as a hash value. The one or more hash values can for example be processed by a MAC function where the MAC function is given a purpose key from a key generator as key.

In one embodiment of the present invention, the authenticity of a computer-executable program file can be verified by calculating the expected MAC value and compare it with the MAC value generated by the program. If these are equal, the computer-executable program file is considered authentic. For example, a server might generate a random key generator IV value and send it to a client program. The client program then generates the MAC value over its own computer-executable program file using the key generator IV as input to the key generator. The generated MAC value is returned to the server. The server already knows the hash value(s), generates the MAC key, and calculates the MAC value. If the server's calculated MAC value is equal to the MAC value received from the client, the client is considered authentic.

In one embodiment of the present invention, a part of the computer-executable program file is not authenticated. This can for example allow for patching and updating without changing data on the server.

In one embodiment of the present invention, a part of a computer-executable program file is updated. The hash value(s) on the server for the parts of the file that is updated are updated to allow the server to verify the authenticity of the new computer-executable program file.

In one embodiment of the present invention, a computer-executable program consists of several files. All or some of these files are included in the authentication process.

In one embodiment of the present invention, a computer-executable program file authenticates itself towards another computer-executable program file. This allows for example sub-modules to authenticate themselves towards a main module.

In one embodiment of the present invention, a computer-executable program file is authenticated towards one or more of:
  Another computer-executable program file (e.g. running on the same computer or on another computer).
  A security-related hardware component (e.g. a Trusted Platform Module (TPM), a smartcard, or a smartcard reader).
  An input-output device (e.g. a graphics adaptor, a screen, a keyboard, a keyboard adaptor, a mouse, a mouse adaptor, a sound card, a speaker, or a microphone).
  A communication device (e.g. a network adaptor, a modem, a switch, a router, or a firewall)
  A network (e.g. towards a switch, a router, or a firewall).
  A storage device (e.g. a hard drive, a storage adaptor, a raid adaptor, a storage-area network (SAN), or a network-attached storage (NAS))
  Another kind of hardware module.
  A program running on another hardware device (e.g. another computer or a server).

In one embodiment of the present invention, the generated authentication tag is used as a key. Different keys can for example be generated by appending different strings to the input to the MAC function.

Secure Communication Link

In one embodiment of the present invention, a purpose key generated by a key generator is used to encrypt data to be transmitted or to decrypt data that has been transmitted.

In one embodiment of the present invention, a purpose key generated by a key generator is used to generate an authentication tag on data to be transmitted or data that has been transmitted. This tag can for example be transmitted along with the data. The transmitted tag can for example be compared with the tag generated by the receiver to verify if the transmitted data is authentic.

In one embodiment of the present invention, a secure communication link is established between a server application and a client application by using the shared knowledge of the client's key generator.

An example of a procedure for establishing a secure communication link:

The client application connects to the server application.

The server generates one or more random key generator IVs and sends them to the client application.

Using the key generator IVs, one or more keys are generated by both the client application and the server application.

Using the one or more keys, data sent between the client application and the server application is encrypted and/or authenticated.

In one embodiment of the present invention, a program authenticity check is built into setting up the link encryption/authentication keys. For example, the key generator IV generated by the server is used to generate an authentication tag authenticating the computer-executable program file. This tag can for example be used as key or one or more keys can be derived from the tag. Keys can be derived for example by appending a string to the authentication tag and hashing it. This hash value is then used e.g. as encryption key. Append another string to the tag and hash it. This second hash value is used e.g. as authentication key. Another example is to use the authentication tag as key and encrypt one string using an encryption algorithm to obtain an encryption key and to encrypt another string to obtain an authentication key.

In one embodiment of the present invention, the key generator IV is generated from a string generated by the server application and a string generated by the client application. These two strings can for example be combined by means of a hash function.

In one embodiment of the present invention, individual messages are protected. An example:

The sending party generates a key generator IV.

Using the key generator IV, an encryption key and an authentication key are generated by a key generator.

The payload string is encrypted and authenticated using the keys.

The protected payload string and the key generator IV are sent to the recipient.

The recipient generates the two keys using the key generator IV.

The recipient verifies the authenticity and decrypts the payload string.

Two key generator IVs may be generated and used instead of one to generate the two keys.

In one embodiment of the present invention, request and response messages are protected. An example:

The requesting party generates a key generator IV.

Using the key generator IV, an encryption key and an authentication key are generated by a key generator.

The request payload string is encrypted and authenticated using the keys.

The protected request string and the key generator IV are sent to the responding party.

The responding party generates keys using the key generator IV.

The protected request string is verified and decrypted by the responding party.

The response payload string is encrypted and authenticated using the keys.

The protected response payload is sent to the requesting party.

The protected response payload is verified and decrypted by the requesting party.

For increased security, the requesting party and the responding party may use different IVs for encryption and authentication or use different keys, e.g. using a derived key generator IV for generating keys for protecting the response payload or using different generator IVs each way. The derived key generator IV may consist of the original key generator IV combined with a key generator IV chosen by the responding party. The responding party's key generator IV may be unique for each message and may be sent with the message to the requesting party. The combination can for example be achieved by XOR'ing the key generator IVs, by concatenating them and hashing the result, or by a block cipher by using the requesting party's key generator IV as plaintext and the responding party's key generator IV as key.

In one embodiment of the present invention, communication link sessions are protected. The communication link may be used to transmit data synchronous or asynchronous. An example:

The client application connects to the server application.

The server application generates a key generator IV and sends it to the client application.

Server and client generate encryption and authentication keys based on the key generator IV.

All sub-sequent messages are protected using these keys.

For increased security, different IVs or different keys could be used for encrypting and/or authenticating each message. The generator IV can for example be a combination of a string generated by the server and a string generated by the client. An example of an application using asynchronous transmission is AJAX (Asynchronous JAva XML).

For some applications, it might be relevant to use only encryption or only authentication. In that case, the above mentioned embodiment can for example be modified by omitting the unneeded key.

In one embodiment of the present invention, the server application and the client application are communicating by means of at least one of:

A TCP/IP socket.

A modem.

An xDSL connection.

A VPN connection.

A SSL or TLS connection.

A web browser (e.g. using HTTP or HTTPS), for example via

Cookies.

Arguments sent to server by GET or POST commands.

Data embedded into HTML, XHTML, or XML.

Data returned by GET or POST commands.

HTTP headers.

E-mail.

Instant messaging applications.

Files.

SMS (e.g. on GSM phones).

In one embodiment of the present invention, the transmitted data protected is payment data. Payment data can for example comprise a credit card number, a password, or a one-time password.

Inner Key Exchange

In one embodiment of the present invention, a secure communication channel is established between a client application and a server application. Through this channel, a key exchange protocol is executed to establish an exchanged set of keys. The key exchange protocol might be based on the Diffie-Hellman protocol. The exchanged set of keys might be used to encrypt and/or authenticate data sent between the client applications and the server application.

In one embodiment of the present invention, a secure channel is established between two computer programs; at least one of them has an embedded key generator. Through this channel, a key exchange protocol is executed to establish an exchanged set of keys. The key exchange protocol might be based on the Diffie-Hellman protocol. The exchanged set of keys might be used to encrypt and/or authenticate data sent between the client applications and the server application.

In one embodiment of the present invention, a secure communication channel is established between a server application and a client application. Through this channel, a public asymmetric key is sent. The party sending the public key has the corresponding private key. One party generates a cryptographic key and encrypts it using one of the asymmetric keys; the encrypted key is sent to the other party which decrypts it using the other asymmetric key. The algorithm used to perform the encryption/decryption might be RSA or ECC.

Secure Storage

In one embodiment of the present invention, a purpose key generated by a key generator is used to encrypt data to be stored or to decrypt data that has been stored.

In one embodiment of the present invention, a purpose key generated by a key generator is used to generate an authentication tag on data to be stored or data that has been stored. A tag can for example be written along with the data. A read tag may be compared with the tag generated by the reader to verify if the stored data is authentic.

Fraud Detection

In one embodiment of the present invention, data are collected to be used to detect fraud. Collected data can for example be one or more of:

User behavior

File positions

Time or date

Place

Hardware profile

Program serial number

Software environment

Collected data about user behavior for typed data can for example be one or more of:

How fast is it typed

How long are the buttons pressed

How long time between key presses

Timings correlated to which keys (e.g. how long time between two keys are pressed if the first is an 'a' and the second is a 'b')

Are characters pasted or typed

When are there breaks in the typing

Collected data about user behavior for mouse movement can for example be one or more of:

Movement pattern

Movement speed

Time between different acts (e.g. from move to click)

How long time the buttons are held down

How fast is double-click

Use of extra mouse buttons or mouse wheels.

Collected data about user behavior in general can for example be one or more of:

Time between an event on the screen and response by the user.

Navigation method (e.g. how much mouse is used vs. shortcut keys).

Pauses (e.g. hesitation).

Collected data about file positions can be one or more of:

Location of the computer-executable program file

Location of external program modules

Location of data files

Collected data about time or data can for example be one or more of:

Time of day

Time of year

Weekday

Day of month

Date

Collected data about place can for example be one of more of:

Geographical area associated to the client's IP number.

Geographical area associated to the client's internet provider.

Geographical area associated with client's phone number.

Collected data about hardware profile and program serial number can for example be as described earlier in this document.

Collected data about the software environment can for example be one or more of:

Which other programs are running?

Is the program started by another program?

If the program is running in a browser: What is the URL of the page it is embedded into?

In one embodiment of the present invention, the collected fraud detection data is stored for later statistical analysis or statistically analyzed when collected. If the statistical profile of the collected data deviates from previously seen statistical data from that user, a representative group of users, or all users, fraud is likely.

In one embodiment of the present invention, data about the user interface is collected. This data can for example be one or more of:

Which window is on top.

Which application receives user input (e.g. keyboard input).

If data has been written directly to the graphics adaptor's image buffer.

If screen saver or screen lock has been activated.

Origin of pasted data

In one embodiment of the present invention, fraud detection data is collected with a certain time interval, on certain events, or (shortly) after certain events. Events can for example be one or more of:

When a character is entered into a text box.

When a key is pressed or released on the keyboard or the mouse.

When the mouse is moved.

When a mouse wheel is moved.

When the window order is changed.

When the application is started.

When the application is stopped.

In one embodiment of the present invention, the fraud detection process for a payment system includes information about the transaction the user is ordering, for example:
- Amount
- Recipient (e.g. if the recipient is well known to the bank and trusted by the bank)
- The user's relation to the recipient (e.g. if money has been sent to that recipient before).
- If the transaction is ordered for a date in the future.
- The date of the transaction (e.g. day of month).

In one embodiment of the present invention, data is collected and grouped. For each group, a score is calculated. If the score from a group or the total score passes a certain level, fraud is suspected and further appropriate action is taken to judge if fraud. If the score from a group or the total score passes another level, fraud is certain and further appropriate action is taken to stop the fraud.

In one embodiment of the present invention, the program collecting the fraud detection data is authenticated using a key generator.

In one embodiment of the present invention, the program collecting the fraud detection data is communicating with another program or a hardware device protected by keys generated by a key generator.

Fraud Prevention

In one embodiment of the present invention, one or more of the following fraud prevention methods are used:
- Flash input fields (for example when suspect data has been entered or data has been entered in a suspect way).
- Add delays (for example such that the user can not enter into another field or press buttons a certain amount of time after an input field has been left).
- Highlight recent changes in input fields.
- Undo changes to input fields that are considered suspicious.

In one embodiment of the present invention, a fraud prevention system is activated if a fraud detection system has detected increased risk of fraud.

Asynchronous Transaction Authentication

In one embodiment of the present invention, a client application of a financial application receives all data from the user on one page. When for example the user has entered recipient account number, the client application looks up the name of the recipient using asynchronous communication (e.g. using AJAX). The name received from the server is displayed on the screen when received even if the user is already typing something else. This eliminates the need for sending the transaction details to the bank's server and then receiving an overview back (e.g. with recipients name) to authenticate. By eliminating this roundtrip, some attacks on the financial transaction are made impossible.

Secure HTML and Form Data

In one embodiment of the present invention, data, e.g. HTML data, XHTML data, or XML data, or part of such data is authenticated and/or encrypted using a key from a key generator.

In one embodiment of the present invention, data entered into a document, e.g. data entered into a HTML form or a XHTML form, or part of such data is authenticated and/or encrypted using a key from a key generator.

In one embodiment of the present invention, an embedded object with a key generator, e.g. a Java applet or an ActiveX object, in a document, e.g. a HTML, XHTML, or XML document, authenticates and/or decrypts the document or part thereof.

In one embodiment of the present invention, an embedded object with a key generator, e.g. a Java applet or an ActiveX object, in a document, e.g. a HTML or XHTML document, authenticates and/or encrypts data entered into one or more forms in the document or part thereof.

In one embodiment of the present invention, an item used in a document, for example an image (e.g. a JPEG, GIF, or PNG file), another document, a program file, or a script file, is authenticated and/or encrypted using a key from a key generator.

In one embodiment of the present invention, a web server will not accept arguments to home pages (e.g. HTTP POST data or the argument to a HTTP GET request) unless they are authenticated using keys generated by a key generator.

In one embodiment of the present invention, a document containing the document with the embedded object with a key generator is protected e.g. by authentication or encryption.

In one embodiment of the present invention, a document contained by the document with the embedded object with a key generator is protected e.g. by authentication or encryption.

In one embodiment of the present invention, a proxy server is positioned in front of a web server such that all data to and from the web server passes through the proxy server. This proxy server modifies all or some of the data sent from the server such that some or all data from the server (e.g. HTML data) is encrypted and/or authenticated and/or some or all data sent to the server (e.g. HTTP POST/GET data) is encrypted and/or authenticated. The proxy server may for example send information about the status of the documents it has sent/received to the web server through a separate channel or through HTTP headers.

In one embodiment of the present invention, information about how to decrypt and/or authenticate a document is transmitted
- in the document,
- in another document,
- in a cookie, or
- in a header (e.g. an HTTP header line).

In one embodiment of the present invention, information about how to decrypt and/or authenticate data entered into a document is transmitted
- in HTTP POST data,
- in arguments to a HTTP GET request,
- in a cookie, or
- in a header (e.g. an HTTP header line).

In one embodiment of the present invention, a client application calculates an authentication tag on the document it has received and sends this tag to the server application in a subsequent request. Thus, the server can verify if the document was received correctly by the client. This can for example be used by the server application to make sure that the user's response was on the correct (and unmodified) document.

In one embodiment of the present invention, Cross-Site Scripting (XSS) attacks are prevented by authenticating all information sent to a web server.

Version Update

In one embodiment of the present invention, a new version of a copy of a computer-executable program file is generated such that the new version has a key generator equivalent to the one of the old version.

In one embodiment of the present invention, an old version of a computer-executable program file downloads a new version with a key generator equivalent to the one of the old version.

In one embodiment of the present invention, an old version of a computer-executable program file in the form of an embedded object in a home page receives a message from a server application telling it to forward the browser to another page using an argument given by the server application. This other page combined with the given arguments allows the web server to send a new version of the computer-executable program file with a key generator equivalent to the one of the old version.

In one embodiment of the present invention, a database containing at least two of: user ID, client program serial numbers, client program version number, and client program PRNG seeds is maintained. When a new version of the client program is sent to a user, the database is updated accordingly.

In one embodiment of the present invention, a client program is updated if certain criteria are fulfilled. For example, when a client program connects to a server, the client program sends an identification string to the server (e.g. containing its serial number). If the server decides that the client program needs to be updated, it sends a message to the client program saying that it should update itself. If the client program is a program embedded into a homepage, the auto update may be initialized by forwarding the containing page to another URL, the other URL initiates the update.

Before a client program embedded into a home page is started, the browser (or another component on the client computer) will usually check if a newer version of the client program is available. The check is usually performed by contacting a server using HTTP or HTTPS. In one embodiment of the present invention, the server decides if a newer version should be downloaded to the user based on at least one of: the content of a cookie, arguments given to the referrer site (can be detected through the "referrer" header line), or the "last-modified" header line.

Applications

The present invention can for example be use in one of:
  A financial application (e.g. a net bank application, an online investment application, a payment site, or an automatic teller machine).
  A computer game (e.g. an online game, e.g. online poker).
  A DRM application (e.g. license manager or a media player).
  A security application (e.g. a VPN client, a remote desktop application, or an anti-virus application).
  A distributed computing application (e.g. to verify authenticity of client applications).

Unique and Random

When the term "unique" is used in this document on number or stings, it may includes randomly chosen numbers or string (e.g. generated by a PRNG) even though these can collide (i.e. there is a certain chance that the same number can be drawn more than once). It should be understood that the method steps, structural details, functionalities and any other feature of any of the methods, computers, computer programs, servers, clients and any other invention described and embodimented herein, may be fully or partially applied in any other method, computer, computer program, server, client and any other invention described and embodimented herein, unless otherwise stated. Hence, all possible combinations of the presently embodimented and described inventions are within the scope of the present specification and embodiments.

DESCRIPTION OF THE FIGURES

FIG. 5 illustrates the steps of a server ($P_1$) verifying if a request for a second document ($D_2$) origins from a reference within an authentic copy of a first document ($D_1$) and if the user data attached to the request ($A_2$) is authentic. First, the client ($P_2$) requests a digital document ($D_1$) from the server ($P_1$). Then, the server ($P_1$) computes an authentication tag ($TD_1$) on the digital document ($D_1$) and stores $TD_1$ for later use. Next, the server ($P_1$) sends the document ($D_1$) to the client ($P_2$). While in transit from $P_1$ to $P_2$, the document may potentially be tampered with. Then, the client ($P_2$) receives a potentially tampered version ($D'_1$) of the document ($D_1$). Next, the client ($P_2$) computes an authentication tag ($TD'_1$) on the potentially tampered document ($D'_1$). Then, the client ($P_2$) receives user input ($A_2$). Next, the client ($P_2$) computes an authentication tag ($TA_2$) on the received user data ($A_2$). Subsequently, the client ($P_2$) sends a request for another digital document ($D_2$) to the server ($P_1$); the request includes the user data ($A_2$) and the authentication tags $TD_1$ and $TA_2$. While in transit from P2 to P1, the request may potentially be tampered with. Then, the server ($P_1$) receives a potentially tampered request and extracts the potentially tampered user data ($A'_2$) and the potentially tampered authentication tags $T'D'_1$ and $T'A_2$. Next, the server ($P_1$) computes an authentication tag ($TA'_2$) on the received user data ($A'_2$). Then, $TD_1$ is compared with $T'D'_1$ and $TA'_2$ is compared with $T'A_2$. If the tags are equal, the request comes from an authentic copy of the document $D_1$ and the user data ($A_1$) has not been tampered with. If the tags are not equal, the request does not come from an authentic copy of the document $D_1$ or the user data ($A_1$) has been tampered with.

Figure 1:
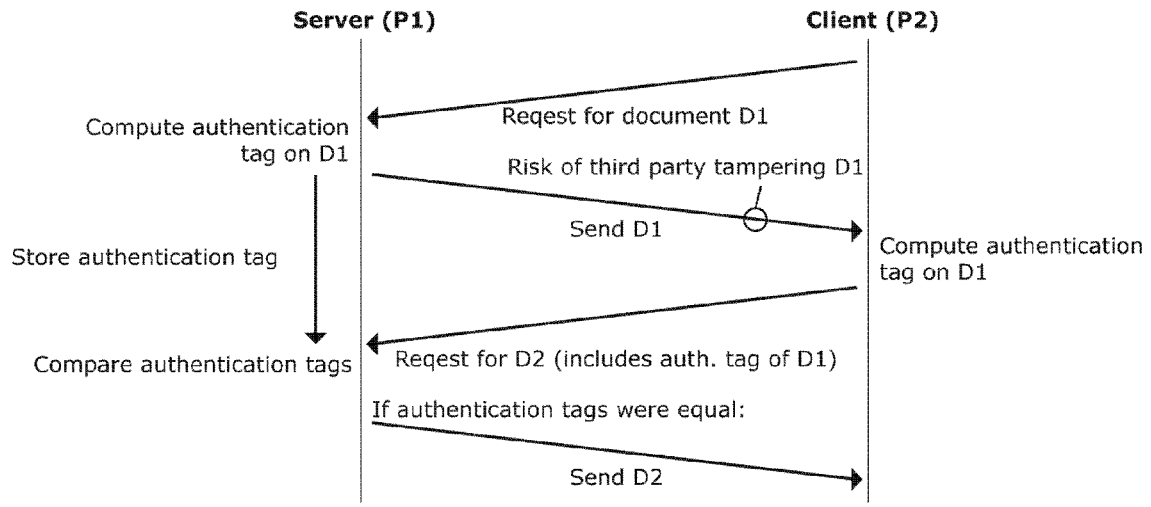
FIG. 1 illustrates a server ($P_1$) (e.g. a web server) that can verify if a request for a second document ($D_2$) origins from a reference within an authentic copy of a first document ($D_1$). First, the client ($P_2$) (e.g. a web browser) requests the first document ($D_1$) from the server ($P_1$). In response to this, the server ($P_1$) computes an authentication tag ($TD_1$) on the first document ($D_1$) and sends the first document ($D_1$) to the client ($P_2$). The document may be tampered with during transit to $P_2$ or while stored on $P_2$ by an unauthorized party (e.g. a third party). The client ($P_2$) shows the potentially tampered copy of the document ($D_1$) in its graphical user interface (e.g. a web browser) and the user activates a link (e.g. a hyper link in an HTML document) in the potentially tampered copy of the first document ($D_1$). Before and/or after the user activates the link in the potentially tampered copy of the first document ($D_1$), the client ($P_2$) computes an authentication tag ($TD_1$) on the potentially tampered copy of the first document ($D_1$). This authentication tag ($TD_1$) is included in the request for the second document ($D_2$) sent to the server ($P_1$). The server ($P_1$) extracts the authentication tag ($TD_1$) and compares it with the one stored from when the server sent the first document ($D_1$) to the client ($P_2$). If the received version and the stored version of the authentication tag ($TD_1$) are equal, the client's copy of the first document ($D_1$) was authentic and the server sends the second document ($D_2$) to the client ($P_2$).
Figure 2:
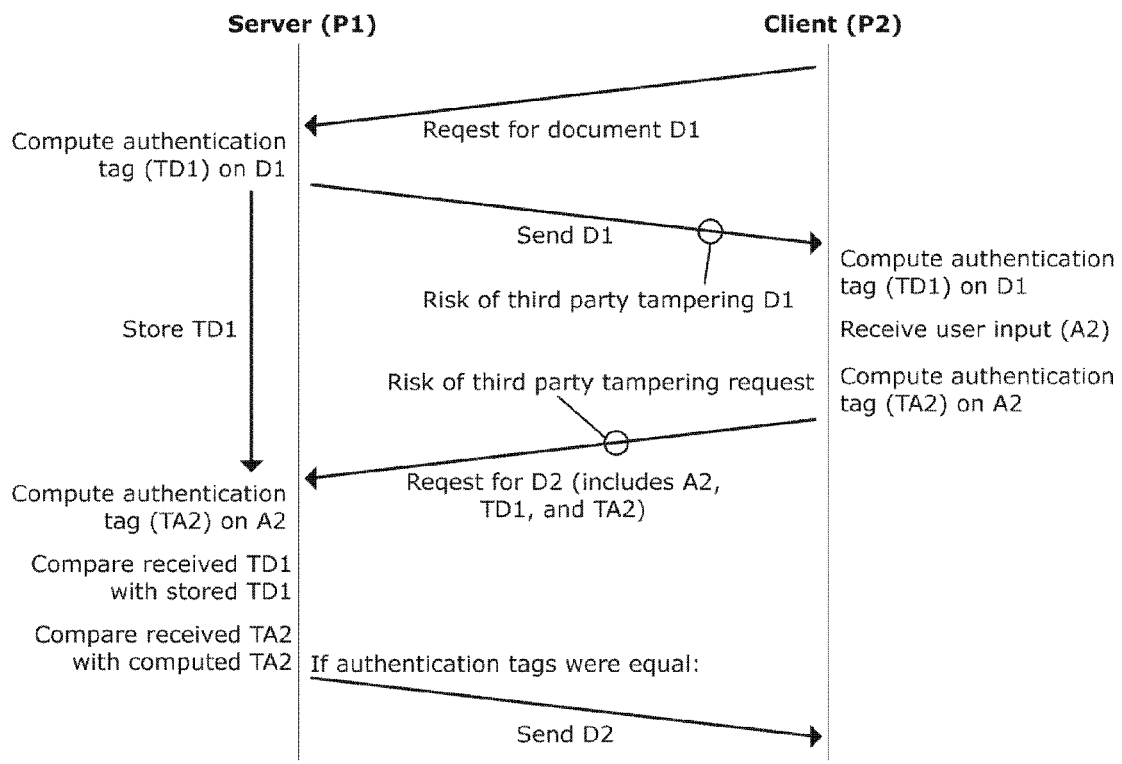
FIG. 2 illustrates a server ($P_1$) that can verity if a request for a second document ($D_2$) origins from a reference within an authentic copy of a first document ($D_1$) and if the user data attached to the request ($A_2$) is authentic. First, the client ($P_2$) requests the first document ($D_1$) from the server ($P_1$). In response to this, the server ($P_1$) computes an authentication tag ($TD_1$) on the first document ($D_1$) and sends the first document ($D_1$) to the client ($P_2$). The document may be tampered with during transit to the client ($P_2$) or while stored on the client ($P_2$) by an unauthorized party (e.g. a third party). The client ($P_2$) shows the potentially tampered copy of the document ($D_1$) in its graphical user interface (e.g. a web browser) and prompts the user for typing in the user data into forms in the shown document ($D_1$). When the user has typed in the user data, an authentication tag ($TA_2$) is computed. When the user presses the submit button in the document ($D_1$), the client ($P_2$) sends a request for a second document ($D_2$) to the server ($P_1$), this requests includes the user data ($A_2$) and the two authentication tags ($TD_1$ and $TA_2$). The request may be tampered with while in transit from the client ($P_2$) to the server ($P_1$). The server ($P_1$) then receives the request for the second document ($D_2$) and extracts the user data ($A_2$) and the two authentication tags ($TD_1$ and $TA_2$). The proxy ($P_1$) computes its own authentication tag ($TA_2$) on the user data ($A_2$). The authentication tag ($TD_1$) on the first document ($D_1$) received is compared with the one stored. Similarly, the authentication tag ($TA_2$) on the user data ($A_2$) received is compared with the one computed. If the authentication tag pairs are equal, the client's copy of the first document ($D_1$) was authentic and the user data ($A_2$) received was authentic and thus, the second document ($D_2$) can be sent to the client ($P_2$).
Figure 3:
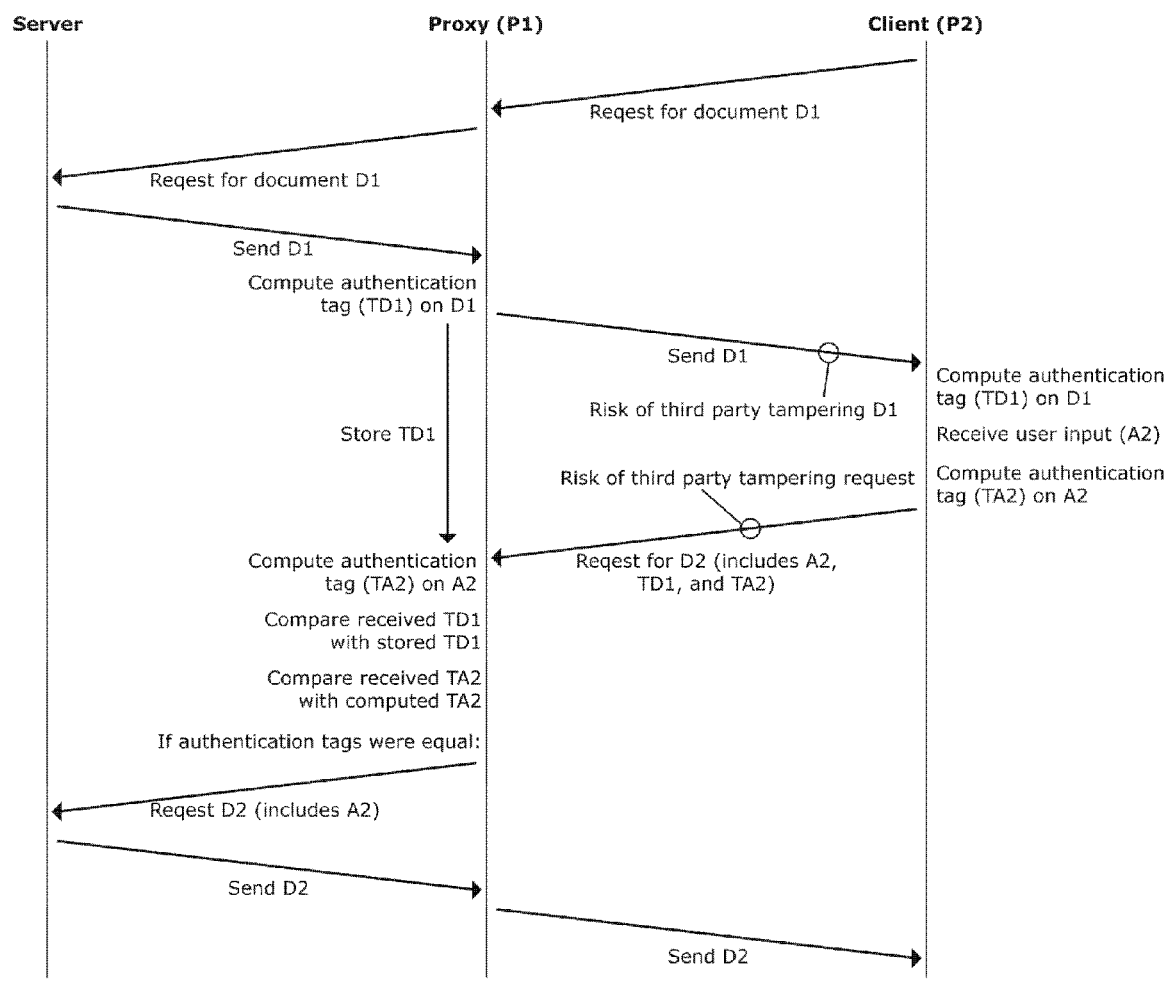
FIG. 3 illustrates a server communicating with a client ($P_2$) through a proxy ($P_1$) where the proxy ($P_1$) can verity if a request for a second document ($D_2$) origins from a reference within an authentic copy of the first document ($D_1$) and if the user data attached to the request ($A_2$) is authentic. First, the client ($P_2$) requests the first document ($D_1$) from the proxy server ($P_1$). The proxy server ($P_1$) forwards the request to the server and the server responds by sending the first document ($D_1$) to the proxy server ($P_1$). The proxy server ($P_1$) computes an authentication tag ($TD_1$) on the first document ($D_1$) and sends the first document ($D_1$) to the client ($P_2$). The document may be tampered with during transit to the client ($P_2$) or while stored on the client ($P_2$) by an unauthorized party (e.g. a third party). The client ($P_2$) shows the potentially tampered copy of the document ($D_1$) in its graphical user interface (e.g. a web browser) and prompts the user for typing in the user data into forms in the shown document ($D_1$). When the user has typed in the user data, an authentication tag ($TA_2$) is computed. When the user presses the submit button in the document ($D_1$), the client ($P_2$) sends a request for a second document ($D_2$) to the proxy ($P_1$), this requests includes the user data ($A_2$) and the two authentication tags ($TD_1$ and $TA_2$). The request may be tampered with while in transit from the client ($P_2$) to the proxy ($P_1$). The proxy ($P_1$) then receives the request for the second document ($D_2$) and extracts the user data ($A_2$) and the two authentication tags ($TD_1$ and $TA_2$). The proxy ($P_1$) computes its own authentication tag ($TA_2$) on the user data ($A_2$). The authentication tag ($TD_1$) on the first document ($D_1$) received is compared with the one stored. Similarly, the authentication tag ($TA_2$) on the user data ($A_2$) received is compared with the one computed. If the authentication tag pairs are equal, the client's copy of the first document ($D_1$) was authentic and the user data ($A_2$) received was authentic and thus, the proxy ($P_1$) forwards the request with the user data ($A_2$) attached to the server. The server responds by sending the second document ($D_2$) to the proxy ($P_1$). The proxy ($D_1$) forwards the second document ($D_2$) to the client ($P_2$).
Figure 4:
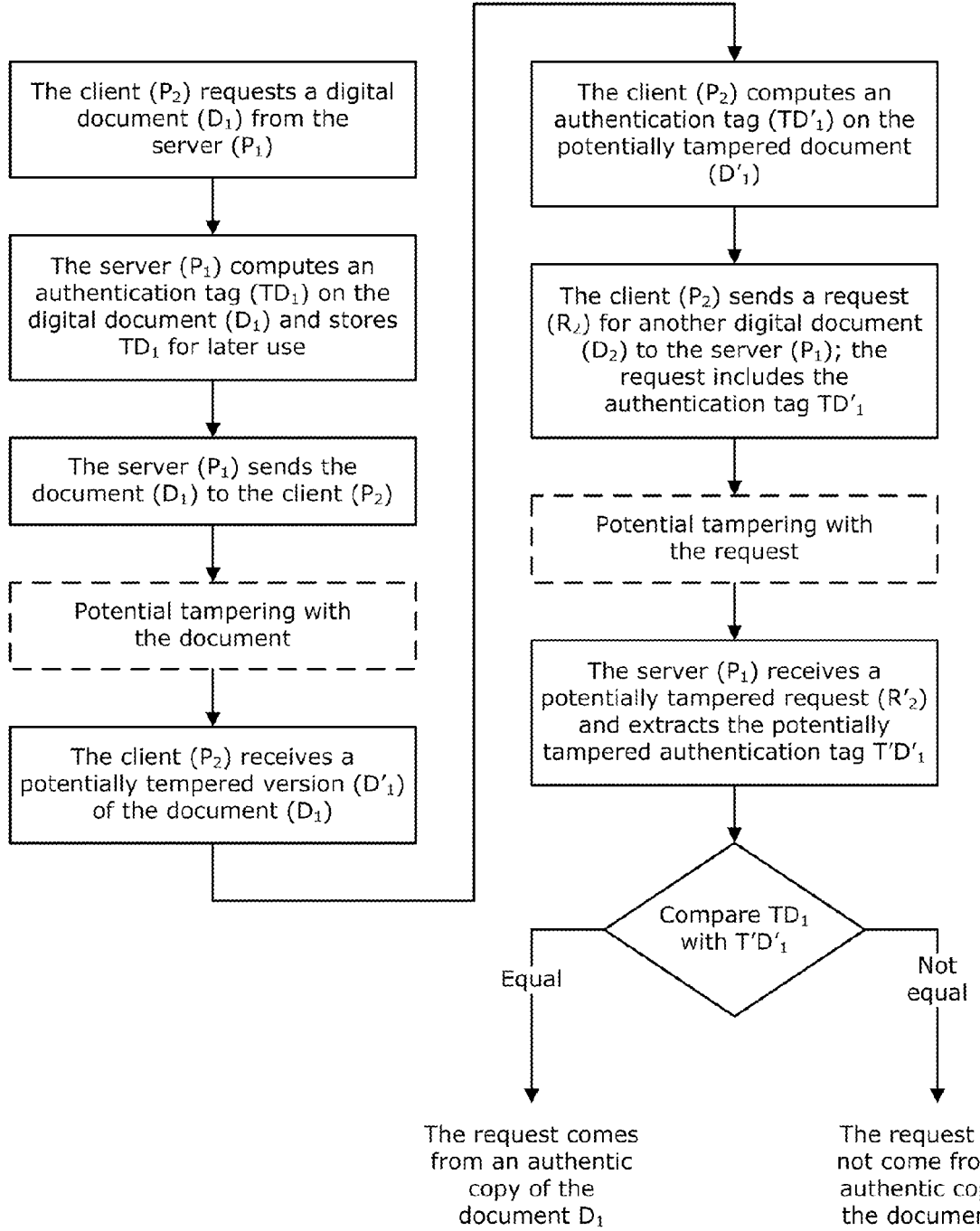
FIG. 4 illustrates the steps of a server ($P_1$) verifying if a request for a second digital document ($D_2$) origins from a reference within an authentic copy of a first document ($D_2$). First, the client ($P_2$) requests a digital document ($D_1$) from the server ($P_1$). Then, the server ($P_1$) computes an authentication tag ($TD_1$) on the digital document ($D_1$) and stores $TD_1$ for later use. Next, the server ($P_1$) sends the document ($D_1$) to the client ($P_2$). While in transit from $P_1$ to $P_2$, the document may potentially be tampered with. Then, the client ($P_2$) receives a potentially tampered version ($D'_1$) of the document ($D_1$). Next, the client ($P_2$) computes an authentication tag ($TD'_1$) on the potentially tampered document ($D'_1$). Then, the client ($P_2$) sends a request ($R_2$) for another digital document ($D_2$) to the server ($P_1$); the request includes the authentication tag $TD'_1$. While in transit from $P_2$ to $P_1$, the request may potentially be tampered with. Then, the server ($P_1$) receives a potentially tampered request ($R'_2$) and extracts the potentially tampered authentication tag $T'D'_1$. Next, $TD_1$ is compared with $T'D'_1$. If the tags are equal, the request comes from an authentic copy of the document $D_1$. If the tags are not equal, the request does not come from an authentic copy of the document $D_1$.
Figure 5:
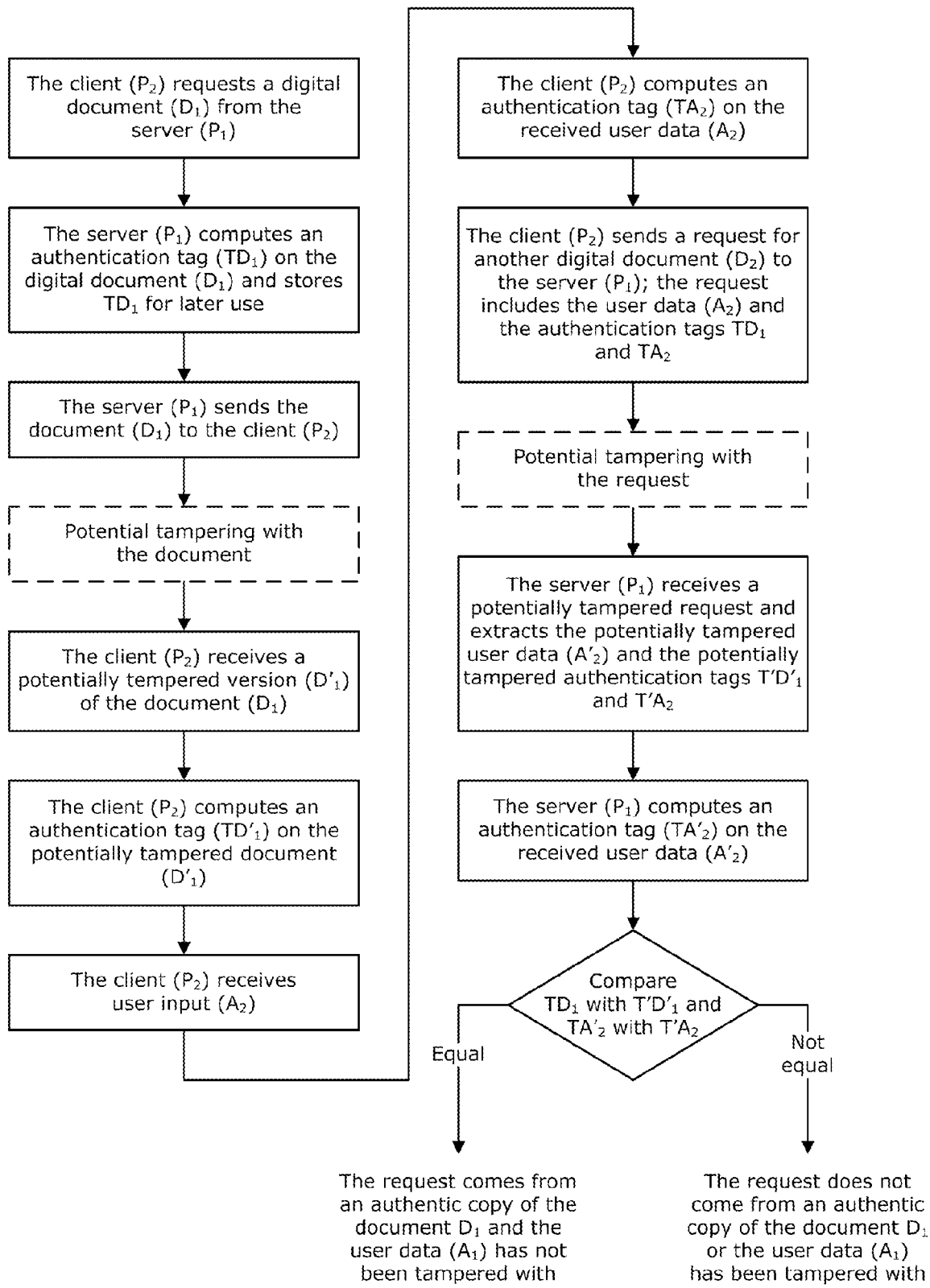
Figure 6:
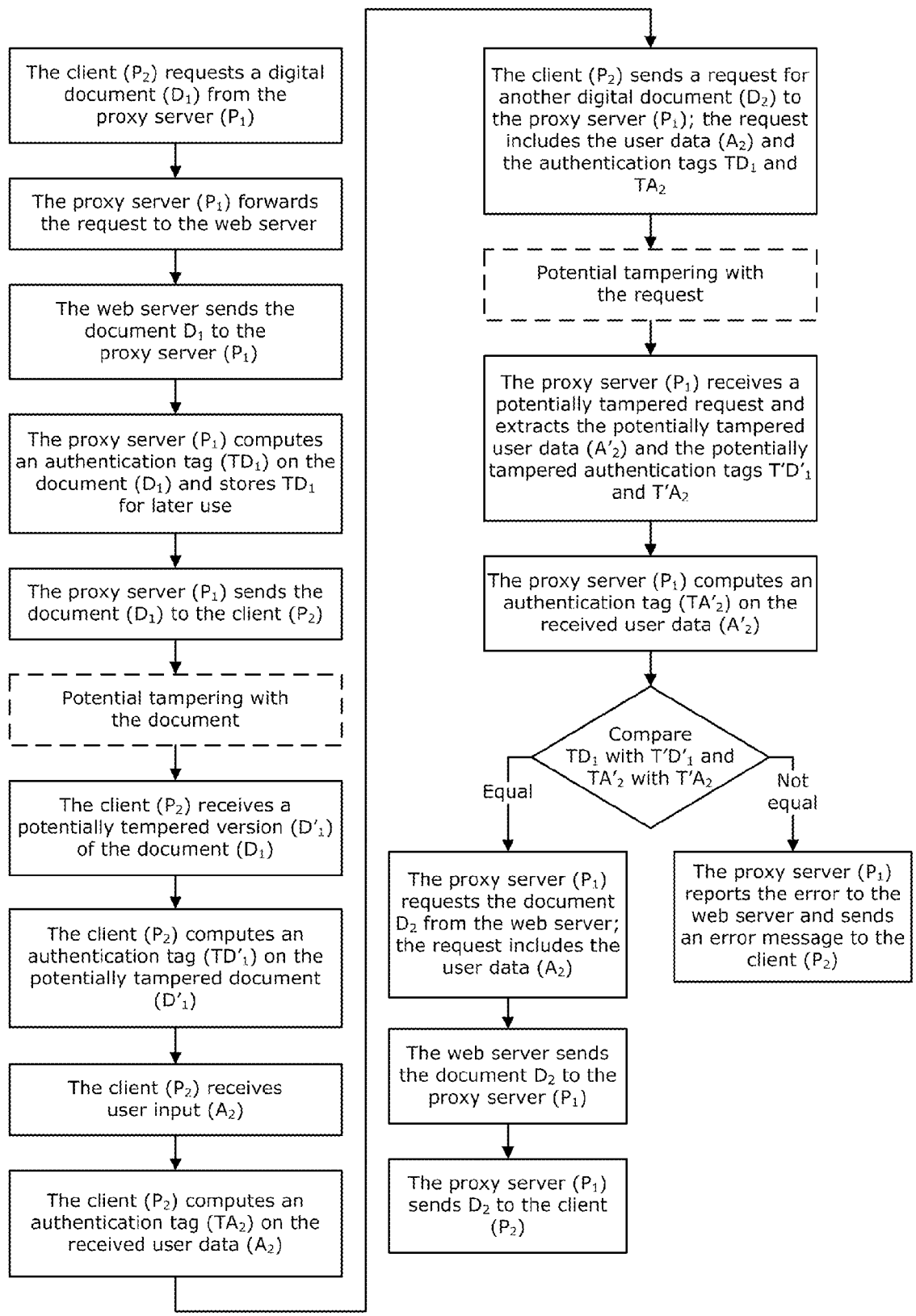
FIG. 6 illustrates the steps of a proxy ($P_1$) verifying if a request for a second document ($D_2$) origins from a reference within an authentic copy of the first document ($D_1$) and if the user data attached to the request ($A_2$) is authentic where the server is communicating with a client ($P_2$) through a proxy ($P_1$). First, the client ($P_2$) requests a digital document ($D_1$) from the proxy server ($P_1$). Then, the proxy server ($P_1$) forwards the request to the web server. Next, the web server sends the document $D_1$ to the proxy server ($P_1$). Then, the proxy server ($P_1$) computes an authentication tag ($TD_1$) on the document ($D_1$) and stores $TD_1$ for later use. Next, the proxy server ($P_1$) sends the document ($D_1$) to the client ($P_2$). While in transit from $P_1$ to $P_2$, the document may potentially be tampered with. Then, the client ($P_2$) receives a potentially tempered version ($D'_1$) of the document ($D_1$). Next, the client ($P_2$) computes an authentication tag ($TD'_1$) on the potentially tempered document ($D'_1$). Then, the client ($P_2$) receives user input ($A_2$). Next, the client ($P_2$) computes an authentication tag ($TA_2$) on the received user data ($A_2$). Then, the client ($P_2$) sends a request for another digital document ($D_2$) to the proxy server ($P_1$); the request includes the user data ($A_2$) and the authentication tags $TD_1$ and $TA_2$. While in transit from P2 to P1, the request may potentially be tampered with. Then, the proxy server ($P_1$) receives a potentially tampered request and extracts the potentially tampered user data ($A'_2$) and the potentially tampered authentication tags $T'D'_1$ and $T'A_2$. Next, the proxy server ($P_1$) computes an authentication tag ($TA'_2$) on the received user data ($A'_2$). Then, $TD_1$ is compared with $T'D'_1$ and $TA'_2$ is compared with $T'A_2$. If the tags are equal, the proxy server ($P_1$) first requests the document $D_2$ from the web server; the request includes the user data ($A_2$). Then, the web server sends the document $D_2$ to the proxy server ($P_1$). Finally, the proxy server ($P_1$) sends $D_2$ to the client ($P_2$). If the tags are not equal, the proxy server ($P_1$) reports the error to the web server and sends an error message to the client ($P_2$).
Figure 7:
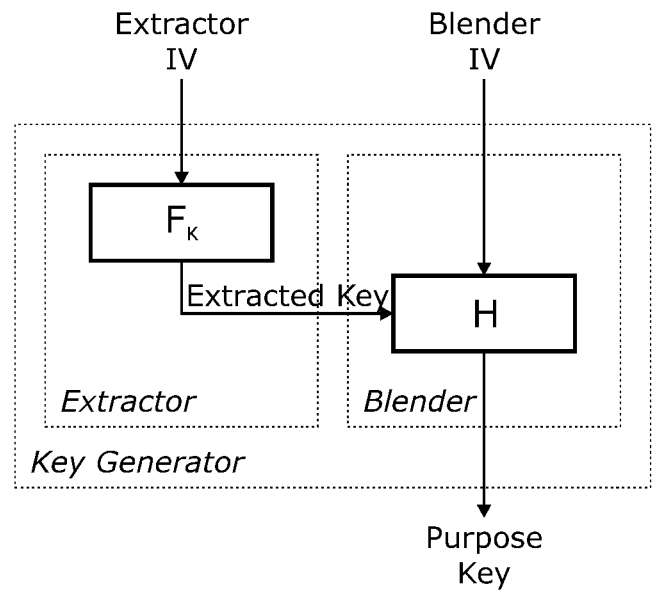
FIG. 7 illustrates a key generator. Internally, it consists of two sub-functions: An extractor and a blender. The extractor takes an extractor IV as input and generates an extracted key. The extractor is usually unique for each copy of a program. The blender takes an extracted key and a blender IV and generates a purpose key.
Figure 8:
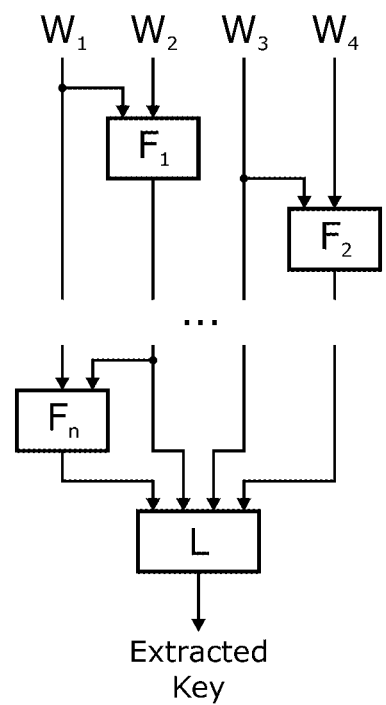
FIG. 8 illustrates an extractor. $W_1$, $W_2$, $W_3$, and $W_4$ represents the initial values of the inner state words, which are being processed by n generator subfunction, $F_1, F_2, \ldots F_n$. The resulting values of the inner state words are processed by a function L to generate an extracted key.
Figure 9:
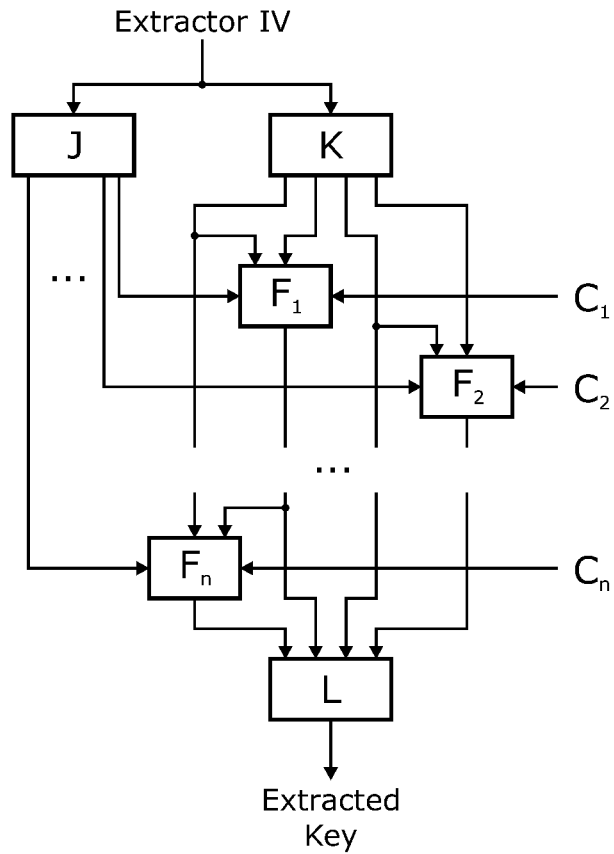
FIG. 9 illustrates an extractor. An extractor IV is used to generate four initial values of the inner state words by the K function. The extractor IV is also used to generate parameters for the generator subfunctions by the J function. The generator subfunctions, $F_1, F_2, \ldots F_n$, manipulates the inner state words and uses each a constant, $C_1, C_2, \ldots C_n$. The resulting inner state words are processed by the L function to obtain an extracted key.
Figure 10:
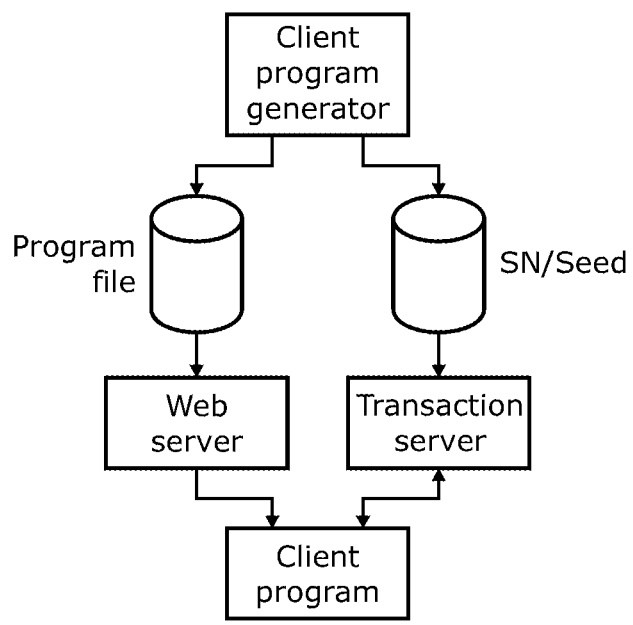
FIG. 10 illustrates a client-server setup. Client programs are generated by a client program generator. The client generator stores the generated program files in a program file database and stores the generated program's serial number and PRNG seed in a SN/Seed database.

When a user downloads a copy of the program from web server, the web server fetches one of the programs in the program database. When the client program communicates with a transaction server, the transaction server can look up the PRNG seed using the programs serial number as key. Using the PRNG seed, the transaction server can reproduce the functionality of the key generator embedded into the client program.

It should be understood that the present invention is not limited to the subject-matter of the appended claims. In particular, the embodiments outlined below form part of the present invention:

1. A method of verifying if a request ($R_2$) for a digital document ($D_2$) origin from a reference within an authentic digital document ($D_1$), the method comprising the steps of
   a first party ($P_1$) sends a first digital document ($D_1$) to a second party ($P_2$);
   $P_2$ receives a possibly tampered version (D'1) of D1;
   $P_1$ computes an first authentication tag ($TD_1$) on at least a part of $D_1$;
   $P_2$ computes an second authentication tag ($TD'_1$) on at least a part of $D'_1$;
   $P_2$ sends a request ($R_2$) for a second digital document ($D_2$) referenced in to $P_1$, $R_2$ includes $TD'_1$;
   $P_1$ receives a possibly tampered version ($R'_2$) of $R_2$ and deducts $T'D'_1$;
   $P_1$ consider $R'_2$ to origin from an authentic $D_1$ if $T'D'_1$ is equal to $TD_1$.

2. A method of verifying if digital data ($A_2$) attached to a request ($R_2$) for a digital document ($D_2$) is authentic, the method comprising the steps of
   a first party ($P_1$) sends a first digital document ($D_1$) to a second party ($P_2$);
   $P_2$ receives a possibly tampered version ($D'_1$) of $D_1$;
   $D'_1$ contains a reference to a second digital document ($D_2$) where a request for that document should include attached digital data;
   $P_2$ collects the digital data ($A_2$) to be included in a request for $D_2$;
   $P_2$ computes a first authentication tag ($TA_2$) on at least a part of $A_2$;
   $P_2$ sends a request ($R_2$) for $D_2$ to $P_1$, $R_2$ includes $A_2$ and $TA_2$
   $P_1$ receives a possibly tampered version ($R'_2$) of $R_2$ and deducts $A'_2$ and $T'A_2$;
   $P_1$ computes a second authentication tag ($TA'_2$) on at least a part of $A'_2$;
   $P_1$ considers $A'_2$ as authentic if $T'A_2$ is equal to $TA'_2$.

3. A method of verifying if a request ($R_2$) for a digital document ($D_2$) origin from a reference within an authentic digital document ($D_1$) and verifying if digital data ($A_2$) attached to $R_2$ is authentic, the method comprising the steps of
   a first party ($P_1$) sends a first digital document ($D_1$) to a second party ($P_2$);
   $P_2$ receives a possibly tampered version ($D'_1$) of $D_1$;
   $P_1$ computes a first authentication tag ($TD_1$) on at least a part of $D_1$;
   $P_2$ computes a second authentication tag ($TD'_1$) on at least a part of $D'_1$;
   $D'_1$ contains a reference to a second digital document ($D_2$) where a request for that document should include attached digital data;
   $P_2$ collects the digital data ($A_2$) to be included in a request for $D_2$;
   $P_2$ computes a third authentication tag ($TA_2$) on at least a part of $D'_2$;
   $P_2$ sends a request ($R_2$) for $D_2$ to $P_1$, $R_2$ includes $A_z$, $TA_z$, and $TD'_1$;
   $P_1$ receives a possibly tampered version ($R'_2$) of $R_2$ and deducts $A'_2$, $T'A_2$,
   $P_1$ computes a fourth authentication tag ($TA'_2$) on at least a part of $A'_2$;
   $P_1$ consider $R'_2$ to origin from an authentic $D_1$ if $T'D'_1$ is equal to $TD_1$;
   $P_1$ consider $A'_2$ as authentic if $T'A_2$ is equal to $TA'_2$.

4. A method according to embodiment 1 or 3 where $TD'_1$ is computed on only a part of $D'_1$; at least a part of the information about which part of to include in the computation is stored within $D_1$.

5. A method according to embodiment 2 or 3 where $TA_2$ is computed on only a part of $A_2$, at least a part of the information about which part of $A_2$ to include in the computation is stored within $D_1$.

6. A method according to embodiment 1 or 3 where $TD'_1$ is computed on only a part of $D'_1$; at least a part of the information about which part of to include in the computation is stored in a digital file that can be downloaded from $P_1$.

7. A method according to embodiment 2 or 3 where $TA_2$ is computed on only a part of $A_2$; at least a part of the information about which part of $A_2$ to include in the computation is stored in a digital file that can be downloaded from $P_1$.

8. A method according to any of embodiments 4-7 where the at least a part of the information about which part to include in the computation is stored in encrypted form.

9. A method according to any of embodiments 4-8 where the at least a part of the information about which part to include in the computation is stored in authenticated form.

10. A method according to any of embodiments 4-9 where the at least a part of the information about which part to included in the computation is included in computing the authentication tag.

11. A method according to any of the preceding embodiments where $P_1$ is a web server.

12. A method according to any of the preceding embodiments where $P_1$ is a proxy server.

13. A method according to any of the preceding embodiments where $P_2$ is a web browser.

14. A method according to any of the preceding embodiments where $P_2$ refuses to send $D_2$ to $P_2$ if $D'_2$ or $A'_2$ is not authentic.

15. A method according to any of the preceding embodiments where $TD'_1$ is computed more than once by $P_2$.

16. A method according to any of the preceding embodiments where $TA_2$ is calculated more than once by $P_2$.

17. A method according to embodiment 15 or 16 where $TD'_1$ or $TA_2$ is computed on at least one of the following events:
   The document is loaded,
   The document is shown,
   A link in the document is activated,
   Script code in the document is activated,
   An amount of time has elapsed,
   A change has occurred to $D_1$, and
   A change has occurred to user data entered into $D_1$.

18. A method according to any of the preceding embodiments where more than one authentication tag similar to $TD'_1$ are computed.

19. A method according to embodiment 18 where the authentication tags are computed on different parts of $D'_1$.

20. A method according to any of the preceding embodiments where more than one authentication tag similar to $TA_2$ are computed.

21. A method according to embodiment 20 where the authentication tags are computed on different parts of $A_2$.

22. A method according to any of embodiments 18-21 where at least one of the authentication tags are computed on at least one of the following events:

The document is loaded,
The document is shown,
A link in the document is activated,
Script code in the document is activated,
An amount of time has elapsed,
A change has occurred to $D_1$, and
A change has occurred to user data entered into $D_1$.

23. A method according to any of the preceding embodiments where at least one authentication tag is calculated by means of at least one of the following methods:
    A hash function
    A MAC function
    A asymmetric digital signature algorithm 24. A method according to any of the preceding embodiments where $D_1$ contains a reference to $D_2$ where a request should include digital data; at least some of this digital data is given in $D_1$.

25. A method according to any of the preceding embodiments where an authentication tag is also given in $D_1$ that authenticates at least some of the given data.

26. A method according to any of the preceding embodiments where a computer program is embedded into $D_1$; this computer program can calculate at least some of the authentication tags to be included in $R_2$.

27. A method according to any of the preceding embodiments where a computer program is referenced in $D_1$; this computer program can calculate at least some of the authentication tags to be included in $R_2$.

28. A method according to embodiment 26 or 27 where each user or group of users uses a different computer-executable program file as the computer program.

29. A method according to embodiment 28 where the computer-executable program file is fabricated from a source code, the computer program including, in said computer-executable program file, at least one embedded value or means for generating at least one value, said value being uniquely selected or uniquely generated for the computer-executable program file, whereby the computer-executable program file is capable of carrying out instructions provided by the source code and of generating a unique output, which depends from said uniquely selected or uniquely generated value.

30. A method according to embodiment 29 where the embedded means for generating at least one value comprises at least one extractor subfunction.

31. A method according to embodiment 30 where at least one of the extractor subfunctions is uniquely selected for each computer-executable program file.

32. A method according to any of the preceding embodiments where at least one reference in $D_1$ is replaced by $P_1$ with a substitute reference; the substitute reference is unique for that copy of $D_1$; $P_1$ maintains a table of substitute references such that it knows which digital document to send to $P_2$ when $P_2$ requests the substitute referenced digital document.

33. A method according to any of the preceding embodiments where a computer program running on the computer of $P_2$ oversees relevant actions on that computer in order to detect unusual behavior.

34. A method according to embodiment 33 where the computer program running on the computer of $P_2$ that oversees relevant actions also computes at least one of the authentication tags to be included in $R_2$.

35. A method according to embodiment 33 or 34 where relevant actions include at least one of:
    Timing of input data received from the user
    Value of input data received from the user
    Visibility of data to be presented to the user 36. A method according to any of the preceding embodiments where rules are defined for what the parts of $D'_1$ not included in calculating $TD'_1$ can contain.

37. A method according to embodiment 36 where the rules includes limitations on where on the screen parts of $D'_1$ not included in calculating $TD'_1$ may be viewed.

38. A method according to embodiment 36 or 37 where the rules are included in $D_1$.

39. A method according to any of the preceding embodiments where at least a part of $R_2$ is encrypted.

40. A method according to any of the preceding embodiments where at least a part of $R_2$ is authenticated.

41. A method according to any of the preceding embodiments where at least one authentication tag computed by $P_2$ depends on a value from $D'_1$.

42. A method according to embodiment 41 where the value from is unique for each copy of $D_1$ sent from $P_1$.

43. A method according to any of the preceding embodiments where at least one authentication tag computed by $P_2$ depends on a value derived from time or date.

44. A method of fabricating computer-executable program files from a source code, the method comprising the step of embedding, in each of the fabricated computer-executable program files, at least one value or means for generating at least one value, said value being uniquely selected or generated for each of the fabricated computer-executable program files, whereby all of the fabricated computer-executable program files are capable of carrying out instructions defined by the source code, and whereby each individual computer-executable program file is capable of generating a unique output, which depends on said uniquely selected or uniquely generated value.

45. A method according to embodiment 44 where each user or group of users uses a different copy of the computer-executable program file.

46. A method according to embodiment 44 or 45 where the embedded means for generating at least one value depends on at least one embedded value.

47. A method according to any of embodiments 44-46 where the process of fabricating computer-executable program files from a source code is divided into at least two steps; a first step of converting source code into at least one intermediate file is performed once and a later step of converting at least one intermediate file and optionally other files into a computer-executable program file is performed for each computer-executable program file.

48. A method according to embodiment 47 where at least one of the intermediate files is a computer-executable program file, an object file, or a source code file.

49. A method according to any of the preceding embodiments where at least a part of the source code is evaluated to determine if it meets one or more predefined criteria for being equipped with the embedded at least one value or means for generating at least one value.

50. A method according to embodiment 47 or 48 where at least one of the intermediate files is evaluated to determine if it meets one or more predefined criteria for being equipped with the embedded at least one value or means for generating at least one value.

51. A method according to embodiment 49 or 50 where the criteria are defined by the organization providing the source code.

52. A method according to any of embodiments 49-51 where the criteria are defined such that the program cannot export sensitive data in an unprotected form.

53. A method according to any of embodiments 49-52 where the criteria are defines such that the program cannot manipulate sensitive data.

54. A method according to any of embodiments 49-53 where information about the criteria is distributed along with the fabricated computer-executable program file who's functionality is evaluated according to the criteria.

55. A method according to any of embodiments 44-54 where the embedded means for generating at least one value comprises at least one extractor subfunctions, the extractor subfunctions have been selected from a set of available extractor subfunctions.

56. A method according to embodiment 55 where the extractor subfunctions are uniquely selected for each computer-executable program file.

57. A method according to embodiment 55 or 56 where at least one extractor subfunctions depend on at least one inner state word and generate at least one inner state word.

58. A method according to any of embodiments 44-54 where the embedded means for generating at least one value comprises at least one extractor subfunction.

59. A method according to embodiment 58 where at least one of the extractor subfunctions is uniquely selected for each computer-executable program file.

60. A method according to embodiment 58 or 59 where at least one of the extractor subfunctions is selected from a set of available extractor subfunctions.

61. A method according to any of embodiments 58-60 where at least one of the extractor subfunctions depend on at least one inner state word and generate at least one inner state word.

62. A method according to any of embodiments 55-61 where at least one extractor subfunction depends on a value derived from a key generator initialization vector (key generator IV) where the key generator IV is given as argument to the embedded means for generating at least one value.

63. A method according to any of embodiments 55-62 where at least one extractor subfunction depends on at least one embedded value.

64. A method according to any of embodiments 55-63 where at least one extractor subfunction comprises at least one of:
   a bijective operation,
   an arithmetical operation,
   a logical operation,
   a table lookup, and
   an embedded value.

65. A method according to any of embodiments 55-64 where the initial value of at least one inner state word depends on a key generator IV.

66. A method according to any of embodiments 55-65 where the output from at least one extractor subfunction or a value derived thereof is used as input to a cryptographic function.

67. A method according to embodiment 66 where the cryptographic function is a hash function.

68. A method according to embodiment 67 where the hash function also depends on at least a part of the key generator IV.

69. A method according to any of embodiments 55-68 where the output from at least one extractor subfunction or a value derived thereof is used as a cryptographic key.

70. A method according to any of embodiments 44-69 where the embedded at least one value or means for generating at least one value is used to derive a cryptographic key.

71. A method according to any of embodiments 44-70 where an embedded value, a value derived thereof, a value generated by means for generating at least one value, or a value derived thereof is used as input to a cryptographic algorithm where the output of the cryptographic algorithm is used as a cryptographic key.

72. A method according to any of embodiments 44-71 where the embedded at least one value or means for generating at least one value is used to authenticate a computer program.

73. A method according to any of embodiments 44-72 where the embedded at least one value or means for generating at least one value is used as a serial number or to derive a serial number that can be used to identify the copy of the computer program.

74. A method according to any of embodiments 44-73 where the embedded at least one value or output from means for generating at least one value is combined with at least one of:
   data from the user,
   data about the user,
   data from something the user possesses, and
   data from the computer the program runs on
to obtain a resulting value.

75. A method according to any of embodiments 44-74 where the means for generating at least one value depends on at least one of:
   data from the user,
   data about the user,
   data from something the user possesses, and
   data from the computer that program runs on
in order to generate a resulting value.

76. A method according to embodiment 74 or 75 where the resulting value is used as a cryptographic key or to obtain a cryptographic key.

77. A method according to any of embodiments 69, 70, 71, or 76 where the cryptographic key is used to encrypt or decrypt data.

78. A method according to embodiment 77 where the cryptographic key is used to encrypt data to be stored or to decrypt data that has been stored.

79. A method according to embodiment 77 where the cryptographic key is used to encrypt data to be transmitted or to decrypt data that has been transmitted.

80. A method according to any of embodiments 69, 70, 71, or 76 where the cryptographic key is used to generate an authentication tag.

81. A method according to embodiment 80 where the authentication tag is appended to data to be stored or is extracted from data that has been stored.

82. A method according to embodiment 80 where the authentication tag is used to authenticate stored data.

83. A method according to embodiment 80 where the authentication tag is appended to data to be transmitted or is extracted and from data that has been transmitted.

84. A method according to embodiment 80 where the authentication tag is used to authenticate transmitted data.

85. A method according to any of embodiments 80-84 where the authentication tag is used to authenticate at least a part of a computer program.

86. A method according to any of embodiments 80-85 where the correctness of the authentication tag is verified by a server.

87. A method according to any of embodiments 80-86 where the correctness of the authentication tag is verified by a hardware device.

88. A method according to any of embodiments 44-87 where information about how a computer-executable program file is generated is stored such that the computer-executable program file can be reproduced or its functionality or part thereof can be reproduced or simulated.

89. A method according to embodiment 88, wherein the stored information about the computer-executable program file is used in a computer program and/or hardware device to reproduce at least a part of the at least one embedded value or to simulate at least a part of the embedded means for generating at least one value.

90. A method of fabricating computer-executable program files according to any of embodiments 44-89 comprising the following steps:
   1. choosing a PRNG seed,
   2. generating a set of pseudo-random values from the PRNG seed using a pseudo-random number generator,
   3. using the set of pseudo-random values to determine at least one embedded value or how to construct the embedded means for generating at least one value.

91. A method of fabricating computer-executable program files according to any of embodiments 44-90 comprising the following steps:
   1. choosing a PRNG seed,
   2. generating a string of pseudo-random bits from the PRNG seed using a pseudo-random number generator,
   3. using the string of pseudo-random bits to determine at least one embedded value or how to construct the embedded means for generating at least one value.

92. A method according to embodiment 90 or 91 where the PRNG seed is stored for later use.

93. A method according to any of embodiments 90-92 where the PRNG seed is used to generate the set of pseudo-random values again; the set of value is used to recreate at least one embedded value or the embedded means for generating at least one value.

94. A method according to any of embodiments 90-93 where the PRNG seed is used to generate the string of pseudo-random bits again; the string of bits is used to recreate at least one embedded value or the embedded means for generating at least one value.

95. A method according to any of embodiments 90 to 94 where the PRNG seed is used to allow a computer program or a hardware device to create the same cryptographic key as a computer-executable program file being executed; the PRNG seed is used to reproduce the embedded at least one value or means for generating at least one value embedded into the computer executable program file on the computer program or hardware device such that both parties can generate the same cryptographic keys derived from the embedded at least one value or means for generating at least one value.

96. A method according to any of embodiments 44-95 where a new version of a computer-executable program file is sent to a user; the new version has the same embedded at least one value or means for generating at least one value as the previous version.

97. A method according to any of embodiments 44-96 where a computer-executable program file with an embedded at least one value for means for generating at least one value downloads or in another way acquires another computer-executable program file with the same embedded at least one value for means for generating at least one value.

98. A method according to any of embodiments 44-97 where the embedded at least one value or means for generating at least one value is copied from one computer-executable program file to another computer-executable program file.

99. A method according to any of embodiments 44-98 where information about program file's embedded at least one value or means for generating at least one value is stored; when a computer-executable program file is updated, this information is updated.

100. A method according to any of embodiments 44-99 where information about a program file's embedded at least one value or means for generating at least one value is stored; when the computer-executable program file is updated, this information is updated.

101. A method according to any of embodiments 44-100 where information about a program file's embedded at least one value or means for generating at least one value is stored in a database; when the computer-executable program file is updated, its record in the database is updated.

102. A method according to any of embodiments 44-101 where the computer-executable program files are obfuscated.

103. A method according to embodiment 102, wherein obfuscation uses a random or pseudo-random input, so that the obfuscated computer-executable program file varies in accordance with the random or pseudo-random input.

104. A method according to embodiment 102 where the obfuscation method comprises means for at least one of:
   replacing a program instruction or a set of program instructions with at least one new program instruction with equivalent functionality,
   reallocating registers,
   reordering program instructions,
   adding or removing jump instructions,
   inserting useless data or program instructions into the computer program,
   interleaving at least two program sequences,
   reordering static data, and
   reordering runtime data.

105. A method according to any of embodiments 44-104 where at least a part of the computer-executable program file is stored in encrypted form and is decrypted at runtime.

106. A method according to embodiment 105 where the key to decrypt the encrypted at least a part of the computer-executable program code is downloaded from a server.

107. A method according to embodiment 106 where the encrypted part of the computer-executable program file is decrypted using a cryptographic key derived from the embedded at least one value or means for generating at least one value.

108. A method according to any of embodiments 44-107 where a computer-executable program file with embedded at least one value or means for generating at least one value decrypts another computer-executable program file.

109. A method according to any of embodiments 44-108 where the destination address of at least one jump instruction in the computer-executable program file is read from a table.

110. A method according to any of embodiments 44-109 where at least one parameter to at least one instruction in the computer-executable program file is read from a table.

111. A method according to embodiment 109 or 110 where the at least one entry in the table has a pre-defined value stored in the computer-executable file.

112. A method according to any of embodiments 109-111 where at least one entry in the table is downloaded from a server.

113. A method according to any of embodiments 109-112 where at least one entry in the table is decrypted at runtime.

114. A method according to embodiment 112 or 113 where at least one downloaded or decrypted value replaces at least one pre-defined value in the table.

115. A method according to embodiment 113 or 114 where the decryption key is derived from the embedded at least one value or means for generating at least one value.

116. A method according to embodiment 113 or 114 where the decryption key is derived from a string downloaded from a server.

117. A method according to any of embodiments 44-116 where a computer-executable program file with at least one embedded value or embedded means for generating at least one value contains program code that can read profile data, the profile data comprises at least one of:
- brand, type, version, or serial number of a hardware component,
- brand, type, version, or serial number of a software component,
- software or hardware configuration data,
- network configuration data, and
- identity of the user.

118. A method according to embodiment 117 where profile data is used as input to the means for generating at least one value.

119. A method according to any of embodiments 44-118 where a computer program (A) communicating with a computer-executable program file with at least one embedded value or embedded means for generating at least one value (B); A can read profile data related to B, the computer B runs on, or the user using B.

120. A method according to any of embodiments 117-119 where profile data is used to detect if the computer-executable program file runs on the right computer.

121. A method according to any of embodiments 44-120 where data sent between program C and D is encrypted/decrypted; the encryption/decryption key is derived from the embedded at least one value or means for generating at least one value in program C; the encryption/decryption key is derived from knowledge about the embedded at least one value or means for generating at least one value in C by program D.

122. A method according to any of embodiments 44-121 where data is sent in encrypted form between programs C and D; the encryption/decryption key is derived from the embedded at least one value or means for generating at least one value in program C; the encryption/decryption key is derived in program D from knowledge about the embedded at least one value or means for generating at least one value in C.

123. A method according to any of embodiments 44-122 where data sent between program E and F is authenticated; the authentication key is derived from the embedded at least one value or means for generating at least one value in program E; the authentication key is derived from knowledge about the embedded at least one value or means for generating at least one value in E by program F.

124. A method according to any of embodiments 121-123 where one party in a communication selects a key generator IV; the key generator IV is sent to the other party; both parties uses the key generator IV to derive a key that can be used for encryption/decryption or authentication.

125. A method according to any of embodiments 121-124 where both parties in a communication selects a part of a key generator IV; the parts are communicated; a key generator IV is derived in both ends from the parts; both parties uses the constructed key generator IV to derived a key that can be used for encryption/decryption or authentication.

126. A method according to any of embodiments 44-125 where data is sent in encrypted form between programs G and H where G and H both communicates securely with server I using cryptographic keys derived from G's and H's embedded at least one value or means for generating at least one value; the server I provides at least one cryptographic key to G and H to be used to encrypt/decrypt at least a part of the data sent between G and H.

127. A method according to any of embodiments 44-126 where data is sent in authenticated form between programs J and K where J and K both communicates securely with server L using cryptographic keys derived from J's and K's embedded at least one value or means for generating at least one value; the server L provides at least one cryptographic key to J and K to be used to authenticate at least a part of the data sent between J and K.

128. A method according to any of embodiments 44-127 where at least one cryptographic key is negotiated between programs M and N where M and N both communicates securely with server O using cryptographic keys derived from M's and N's embedded at least one value or means for generating at least one value 129. A method according to embodiment 128 where O provides the same cryptographic key to M and N.

130. A method according to embodiment 128 or 129 where at least one of the at least one cryptographic keys is used to encrypt/decrypt data sent between M and N.

131. A method according to any of embodiments 84-86 where at least one of the at least one cryptographic keys is used to authenticate data sent between M and N.

132. A method according to any of embodiments 44-125 where data is sent in encrypted form between programs P and Q; P derives the encryption/decryption key from its embedded at least one value or means for generating at least one value; Q receives the encryption/decryption key from a server.

133. A method according to any of embodiments 44-125 where data sent between programs R and S is authenticated; R derives the authentication key from its embedded at least one value or means for generating at least one value; S receives the authenticate key from a server.

134. A method according to any of embodiments 126-133 where the two programs run on the same computer.

135. A method according to embodiment 134 where the two programs read profile data and compare these to verify that they run on the same computer.

136. A method according to any of embodiments 126-133 where the two programs run on different computers.

137. A method according to any of embodiments 44-136 where key exchange protocol data is encrypted or decrypted using a cryptographic key derived from an embedded at least one value or means for generating at least one value.

138. A method according to any of embodiments 44-137 where key exchange protocol data is authenticated using a cryptographic key derived from an embedded at least one value or means for generating at least one value.

139. A method according to embodiment 137 or 138 where the key exchange protocol is the Diffie-Hellman protocol.

140. A method according to any of embodiments 137-139 where the key exchange protocol is used to derive a symmetrical cryptographic key.

141. A method according to any of embodiments 44-140 where an asymmetric key is encrypted or decrypted using a cryptographic key derived from an embedded at least one value or means for generating at least one value.

142. A method according to any of embodiments 44-141 where an asymmetric key is authenticated using a cryptographic key derived from an embedded at least one value or means for generating at least one value.

143. A method according to embodiment 141 or 142 where the asymmetric key is a public RSA key or a private RSA key.

144. A method according to embodiment 141 or 142 where the asymmetric key is a public ECC key or a private ECC key.

145. A method according to any of embodiments 141-144 where the asymmetric key is used to derive a symmetrical cryptographic key.

146. A method according to embodiment 140 or 145 where the symmetrical key is used to encrypt or decrypt data.

147. A method according to any of embodiments 140, 145, and 146 where the symmetrical key is used to authenticate data.

148. A method according to any of embodiments 44-147 where data to be stored is encrypted or data that has been stored is decrypted; the encryption/decryption key is derived from the embedded at least one value or means for generating at least one value.

149. A method according to any of embodiments 44-148 where data to be stored or that has been stored is processed in order to generate an authentication tag; the authentication key is derived from the embedded at least one value or means for generating at least one value.

150. A method according to embodiment 148 or 149 where a key generator IV is used to derive the encryption/decryption key or authentication key; the key generator IV is stored with the data.

151. A method according to embodiment 148 or 149 where a value stored with the data is hashed with profile data to obtain a key generator IV used to derive the encryption/decryption key or authentication key.

152. A method according to any of embodiments 44-151 where a cryptographic key is stored in encrypted form; the decryption key to be used to decrypt the cryptographic key is derived from the embedded at least one value or means for generating at least one value.

153. A method according to any of embodiments 44-152 where a cryptographic key is stored in encrypted form; the decryption key to be used to decrypt the cryptographic key is downloaded from a server.

154. A method according to any of embodiments 44-153 where a computer program or a computer-executable program file is authenticated using an authentication key derived from the embedded at least one value or means for generating at least one value.

155. A method according to embodiment 154 where a computer program or a computer-executable program file is authenticated towards another computer program or a hardware device.

156. A method according to embodiment 154 or 155 where a computer program is calculating an authentication tag on itself.

157. A method according to any of embodiments 44-156 where an authentication tag is calculated on a computer program, a computer-executable program file, or a data file; the authentication key is derived from an embedded at least one value or means for generating at least one value, the authentication tag is compared to one stored with the program or data to verify if the program or data is authentic and if the stored tag was generated by someone with knowledge about the embedded at least one value or means for generating at least one value.

158. A method according to embodiment 157 where the embedded at least one value or means for generating at least one value is stored on a device and the program or file to be authenticated is a program the be executed or accessed on that device.

159. A method according to embodiment 157 or 158 where the stored authentication tag is generated with knowledge about the embedded at least one value or means for generating at least one value.

160. A method according to any of embodiments 44-159 where a computer-executable program file with the embedded at least one value or means for generating at least one value is used to play back digital content.

161. A method according to any of embodiments 44-160 where digital content is distributed in encrypted form; the encrypted content is decrypted by a computer-executable program file with an embedded at least one value or means for generating at least one value in order to play back the digital content.

162. A method of generating a media player with at least one uniquely selected value or at least one value generated by uniquely selected means is used to play back digital content produced by a method according to any of embodiments 44-161.

163. A method of distributing a decryption key for digital content to a playback device; the playback device is constructed by a method according to any of embodiments 44-162.

164. A method according to any of embodiments 44-163 where the fabricated computer-executable program file is tested to verify if it works as intended.

165. A method according to any of embodiments 44-164 where at least one fabricated computer-executable program file is inserted into another file.

166. A server from which computer-executable program files fabricated according to any of embodiments 44-165 can be downloaded.

167. A server communicating with a computer-executable program file fabricated according to any of embodiments 44-166.

168. A file written by a computer-executable program file fabricated according to any of embodiments 44-167.

169. An file encrypted using a key; the decryption key can be derived or decrypted using at an embedded at least one value or means for generating at least one value in a computer-executable program file fabricated according to any of embodiments 44-168.

170. Data sent over a network; the data is encrypted by a computer-executable program file fabricated according to any of embodiments any of embodiments 44-169.

171. Data sent over a network; the data is encrypted using a key; the decryption key can be derived or decrypted using an embedded at least one value or means for generating at least one value in a computer-executable program file fabricated according to any of embodiments any of embodiments 44-170.

172. Data sent over a network; the data is authenticated by a computer-executable program file fabricated according to any of embodiments 44-171.

173. Data sent over a network; the data is authenticated using a key; the decryption key can be derived or decrypted using an embedded at least one value or means for generating at least one value in a computer-executable program file fabricated according to any of embodiments 44-172.

174. A document into which at least one computer-executable program file fabricated according to any of embodiments 44-173 is embedded.

175. A computer on which at least one computer-executable program file fabricating according to any of embodiments 44-174 is stored or executed.

176. A computer program for fabricating computer-executable program files from source code, the computer program comprising means for performing the method of any of embodiments 44-175.

177. A computer-readable data medium comprising a computer program according to embodiment 176.

178. A computer loaded with a computer program according to embodiment 176.

179. A computer-executable program file fabricated by a method according to any of embodiments 44-165.

180. A method according to any of the preceding embodiments of fabricating computer-executable program files according to any of embodiments 181-437.

181. A computer program comprising a computer-executable program file fabricated from a source code, the computer program including, in said computer-executable program file, at least one embedded value or means for generating at least one value, said value being uniquely selected or uniquely generated for the computer-executable program file, whereby the computer-executable program file is capable of carrying out instructions provided by the source code and of generating a unique output, which depends from said uniquely selected or uniquely generated value.

182. A computer program according to embodiment 181, wherein the computer-executable program file is fabricated by a method according to any of embodiments 44-180.

183. A computer-readable data medium comprising a computer program according to embodiment 181 or 182.

184. A computer loaded with a computer program according to embodiment 183.

185. A computer program according to any of embodiments 181-184 where the embedded means for generating at least one value comprises at least one extractor subfunction.

186. A computer program according to embodiment 185 where at least one of the extractor subfunctions is uniquely selected for each computer-executable program file.

187. A computer program according to embodiment 185 or 186 where at least one of the extractor subfunctions is selected from a set of available extractor subfunctions.

188. A computer program according to any of embodiments 185-187 where at least one of the extractor subfunctions depends on at least one inner state word and generates at least one inner state word.

189. A computer program according to any of embodiments 185-188 where at least one of the extractor subfunctions depends on a value derived from a key generator initialization vector (key generator IV) where the key generator IV is given as argument to the embedded means for generating at least one value.

190. A computer program according to any of embodiments 185-189 where at least one of the extractor subfunctions depends on at least one embedded value.

191. A computer program according to any of embodiments 185-190 where at least one of the extractor subfunctions comprises at least one of:
a bijective operation,
an arithmetical operation,
a logical operation,
a table lookup, and
an embedded value.

192. A computer program according to any of embodiments 185-191 where the initial value of at least one of the inner state word depends on a key generator IV.

193. A computer program according to any of embodiments 185-192 where the output from at least one of the extractor subfunction or a value derived thereof is used as input to a cryptographic function.

194. A computer program according to embodiment 193 where the cryptographic function is a hash function.

195. A computer program according to embodiment 194 where the hash function also depends on at least a part of the key generator IV.

196. A computer program according to any of embodiments 185-195 where the output from at least one of the extractor subfunction or a value derived thereof is used as a cryptographic key.

197. A computer program according to any of embodiments 181-196 where at least one embedded value is changed at runtime.

198. A computer program according to any of embodiments 181-197 where at least one of the at least one embedded uniquely selected values is changed at runtime.

199. A computer program according to embodiment 197 or 198 where the new value of an embedded value is read from a file.

200. A computer program according to any of embodiments 197-199 where the new value of an embedded value is received from a server.

201. A computer program according to any of embodiments 181-200 where at least one embedded value is replaced with a value obtained from a cryptographic function.

202. A computer program according to embodiment 201 where the cryptographic function is a pseudo-random number generator.

203. A computer program according to 181-202 where at least one embedded value is encrypted or decrypted using a cryptographic algorithm.

204. A computer program according to embodiment 202 or 203 where the PRNG seed or cryptographic key is read from a file.

205. A computer program according to embodiment 202 or 203 where the PRNG seed or cryptographic key is received from a server.

206. A computer program according to any of embodiments 181-205 where the embedded at least one value or means for generating at least one value is used to derive a cryptographic key.

207. A computer program according to any of embodiments 181-206 where an embedded value, a value derived thereof, a value generated by means for generating at least one value, or a value derived thereof is used as input to a cryptographic algorithm where the output of the cryptographic algorithm is used as a cryptographic key.

208. A computer program according to any of embodiments 181-207 where the embedded at least one value or means for generating at least one value is used to authenticate a computer program.

209. A computer program according to any of embodiments 181-208 where the embedded at least one value or means for generating at least one value is used as a serial number or to derive a serial number that can be used to identify the copy of the computer program.

210. A computer program according to any of embodiments 181-209 where the embedded at least one value or output from means for generating at least one value is combined with at least one of:
data from the user,
data about the user,
data from something the user possesses, and
data from the computer the program runs on
to obtain a resulting value.

211. A computer program according to any of embodiments 181-210 where the means for generating at least one value depends on at least one of:
data from the user,
data about the user,
data from something the user possesses, and
data from the computer that program runs on
in order to generate a resulting value.

212. A computer program according to embodiment 181 or 211 where the resulting value is used as a cryptographic key or to obtain a cryptographic key.

213. A computer program according to any of embodiments 196, 206, 207, or 212 where the cryptographic key is used to encrypt or decrypt data.

214. A computer program according to embodiment 213 where the cryptographic key is used to encrypt data to be stored or to decrypt data that has been stored.

215. A computer program according to embodiment 213 where the cryptographic key is used to encrypt data to be transmitted or to decrypt data that has been transmitted.

216. A computer program according to any of embodiments 196, 206, 207, or 212 where the cryptographic key it used to generate an authentication tag.

217. A computer program according to embodiment 216 where the authentication tag is appended to data to be stored or is extracted from data that has been stored.

218. A computer program according to embodiment 216 where the authentication tag is used to authenticate data that has been stored.

219. A computer program according to embodiment 216 where the authentication tag is appended to data to be transmitted or is extracted and from data that has been transmitted.

220. A computer program according to embodiment 216 where the authentication tag is used to authenticate data that has been transmitted.

221. A computer program according to any of embodiments 216-220 where the authentication tag is used to authenticate at least a part of a computer program.

222. A computer program according to any of embodiments 216-221 where the correctness of the authentication tag is verified by a server.

223. A computer program according to any of embodiments 216-222 where the correctness of the authentication tag is verified by a hardware device.

224. A computer program according to any of embodiments 181-223 where a check sum is calculated on a software module; the check sum is compared to an expected value to determine of the software module is authentic.

225. A computer program according to embodiment 224 where the check sum is calculated by a cryptographic function.

226. A computer program according to embodiment 225 where the cryptographic functions is a hash function.

227. A computer program according to any of embodiments 181-226 where a new version of a computer-executable program file is sent to a user; the new version has the same embedded at least one value or means for generating at least one value as the previous version.

228. A computer program according to any of embodiments 181-227 where a computer-executable program file with an embedded at least one value for means for generating at least one value downloads or in another way acquires another computer-executable program file with the same embedded at least one value for means for generating at least one value.

229. A computer program according to any of embodiments 181-228 where the embedded at least one value or means for generating at least one value is copied from one computer-executable program file to another computer-executable program file.

230. A computer program according to any of embodiments 181-229 where information about a program file's embedded at least one value or means for generating at least one value is stored; when the computer-executable program file is updated, this information is updated.

231. A computer program according to any of embodiments 181-229 where information about a program file's embedded at least one value or means for generating at least one value is stored in a database; when the computer-executable program file is updated, its record in the database is updated.

232. A computer program according to any of embodiments 181-231 where the computer program is obfuscated.

233. A computer program according to embodiment 232 where the obfuscation method comprises means for at least one of:
   replacing a program instruction or a set of program instructions with at least one new program instruction with equivalent functionality,
   reallocating registers,
   reordering program instructions,
   adding or removing jump instructions,
   inserting useless data or program instructions into the computer program,
   interleaving at least two program sequences,
   reordering static data, and
   reordering runtime data.

234. A computer program according to any of embodiments 181-233 where at least a part of the computer-executable program file is stored in encrypted form and is decrypted at runtime.

235. A computer program according to embodiment 234 where the key to decrypt the encrypted at least a part of the computer-executable program code is downloaded from a server.

236. A computer program according to embodiment 235 where the encrypted part of the computer-executable program file is decrypted using a cryptographic key derived from the embedded at least one value or means for generating at least one value.

237. A computer program according to any of embodiments 181-236 where a computer-executable program file with embedded at least one value or means for generating at least one value decrypts another computer-executable program file.

238. A computer program according to any of embodiments 181-237 where the destination address of at least one jump instruction in the computer-executable program file is read from a table.

239. A method according to any of embodiments 181-238 where at least one parameter to at least one instruction in the computer-executable program file is read from a table.

240. A computer program according to embodiment 238 or 239 where the at least one entry in the table has a pre-defined value stored in the computer-executable file.

241. A computer program according to any of embodiments 238-240 where at least one entry in the table is downloaded from a server.

242. A computer program according to any of embodiments 238-241 where at least one entry in the table is decrypted at runtime.

243. A computer program according to embodiment 241 or 242 where at least one downloaded or decrypted value replaces at least one pre-defined value in the table.

244. A computer program according to embodiment 242 or 243 where the decryption key is derived from the embedded at least one value or means for generating at least one value.

245. A computer program according to embodiment 242 or 243 where the decryption key is downloaded from a server.

246. A computer program according to any of embodiments 181-245 capable of reading profile data, the profile data comprises at least one of:
   brand, type, version, or serial number of a hardware component,
   brand, type, version, or serial number of a software component, software or hardware configuration data,
network configuration data, and
identity of the user.

247. A computer program according to embodiment 246 where profile data is used as input to the means for generating at least one value.

248. A computer program according to embodiment 246 or 247 where profile data is used to detect if the computer program runs on the right computer.

249. A computer program according to any embodiments 181-248 where data sent between program C and D is encrypted/decrypted; the encryption/decryption key is derived from the embedded at least one value or means for generating at least one value in program C; the encryption/decryption key is derived from knowledge about the embedded at least one value or means for generating at least one value in C by program D.

250. A computer program according to embodiments 181-249 where data is sent in encrypted form between programs C and D; the encryption/decryption key is derived from the embedded at least one value or means for generating at least one value in program C; the encryption/decryption key is derived from knowledge about the embedded at least one value or means for generating at least one value in C by program D.

251. A computer program according to embodiments 181-250 where data sent between program E and F is authenticated; the authentication key is derived from the embedded at least one value or means for generating at least one value in program E; the authentication key is derived from knowledge about the embedded at least one value or means for generating at least one value in E by program F.

252. A computer program according to any of embodiments 249-251 where one party in a communication selects a key generator IV; the key generator IV is sent to the other party; both parties uses the key generator IV to derive a key that can be used for encryption/decryption or authentication.

253. A computer program according to any of embodiments 249-251 where both parties in a communication selects a part of a key generator IV; the parts are communicated; a key generator IV is derived in both ends from the parts; both parties uses the constructed key generator IV to derived a key that can be used for encryption/decryption or authentication.

254. A computer program (G) according to any of embodiments 181-253 where data is sent in encrypted form between programs G and H where G and H both communicates securely with server I using cryptographic keys derived from G's and H's embedded at least one value or means for generating at least one value; the server I provides at least one cryptographic key to G and H to be used to encrypt/decrypt at least a part of the data sent between G and H.

255. A computer program (J) according to any of embodiments 181-254 where data is sent in authenticated form between programs J and K where J and K both communicates securely with server L using cryptographic keys derived from J's and K's embedded at least one value or means for generating at least one value; the server L provides at least one cryptographic key to J and K to be used to authenticate at least a part of the data sent between J and K.

256. A computer program (M) according to any of embodiments 181-255 where at least one cryptographic key is negotiated between programs M and N where M and N both communicates securely with server O using cryptographic keys derived from M's and N's embedded at least one value or means for generating at least one value 257. A computer program according to embodiment 256 where O provides the same cryptographic key to M and N.

258. A computer program according to embodiment 256 or 257 where at least one of the at least one cryptographic keys is used to encrypt/decrypt data sent between M and N.

259. A computer program according to any of embodiments 256-258 where at least one of the at least one cryptographic keys is used to authenticate data sent between M and N.

260. A computer program (P) according to any of embodiments 181-259 where data is sent in encrypted form between programs P and Q; P derives the encryption/decryption key from its embedded at least one value or means for generating at least one value; Q receives the encryption/decryption key from a server.

261. A computer program (O) according to any of embodiments 181-259 where data is sent in encrypted form between programs P and Q; P derives the encryption/decryption key from its embedded at least one value or means for generating at least one value; Q receives the encryption/decryption key from a server.

262. A computer program (R) according to any of embodiments 181-259 where data sent between programs R and S is authenticated; R derives the authentication key from its embedded at least one value or means for generating at least one value; S receives the authenticate key from a server.

263. A computer program (S) according to any of embodiments 181-259 where data sent between programs R and S is authenticated; R derives the authentication key from its embedded at least one value or means for generating at least one value; S receives the authenticate key from a server.

264. A computer program according to any of embodiments 254-263 where the two communicating programs run on the same computer.

265. A computer program according to embodiment 264 where the two communicating programs read profile data and compare these to verify that they run on the same computer.

266. A computer program according to any of embodiments 254-263 where the two communicating programs run on different computers.

267. A computer program according to any of embodiments 246-266 where the two computer programs communicating is a computer program and a software module loaded by the computer program.

268. A computer program according to embodiment 267 where the software module is a .dll file.

269. A computer program according to any of embodiments 181-268 where key exchange protocol data is encrypted or decrypted using a cryptographic key derived from an embedded at least one value or means for generating at least one value.

270. A computer program according to any of embodiments 181-269 where key exchange protocol data is authenticated using a cryptographic key derived from an embedded at least one value or means for generating at least one value.

271. A compute program according to embodiment 269 or 270 where the key exchange protocol is the Diffie-Hellman protocol.

272. A computer program according to any of embodiments 269-271 where the key exchange protocol is used to derive a symmetrical cryptographic key.

273. A computer program according to any of embodiments 181-272 where an asymmetric key is encrypted or decrypted using a cryptographic key derived from an embedded at least one value or means for generating at least one value.

274. A computer program according to any of embodiments 181-273 where an asymmetric key is authenticated using a cryptographic key derived from an embedded at least one value or means for generating at least one value.

275. A computer program according to embodiment 273 or 274 where the asymmetric key is a public RSA key or a private RSA key.

276. A computer program according to embodiment 273 or 274 where the asymmetric key is a public ECC key or a private ECC key.

277. A computer program according to any of embodiments 273-276 where the asymmetric key is used to derive a symmetrical cryptographic key.

278. A computer program according to embodiment 272 or 277 where the symmetrical key is used to encrypt or decrypt data.

279. A computer program according to any of embodiments 272, 277, and 278 where the symmetrical key is used to authenticate data.

280. A computer program according to any of embodiments 181-279 where data to be stored is encrypted or data that has been stored is decrypted; the encryption/decryption key is derived from the embedded at least one value or means for generating at least one value.

281. A computer program according to any of embodiments 181-280 where data to be stored or that has been stored is processed in order to generate an authentication tag; the authentication key is derived from the embedded at least one value or means for generating at least one value.

282. A computer program according to embodiment 280 or 281 where a key generator IV is used to derive the encryption/decryption key or authentication key; the key generator IV is stored with the data.

283. A computer program according to embodiment 280 or 281 where a value stored with the data is hashed with profile data to obtain a key generator IV used to derive the encryption/decryption key or authentication key.

284. A computer program according to any of embodiments 181-283 where a cryptographic key is stored in encrypted form; the decryption key to be used to decrypt the cryptographic key is derived from the embedded at least one value or means for generating at least one value.

285. A computer program according to any of embodiments 181-284 where a cryptographic key is stored in encrypted form; the decryption key to be used to decrypt the cryptographic key is downloaded from a server.

286. A computer program according to any of embodiments 181-285 where credit card information is encrypted or decrypted using a cryptographic key derived from the embedded at least one value or means for generating at least one value.

287. A computer program according to any of embodiments 181-286 where payment authorization data is encrypted or decrypted using a cryptographic key derived from the embedded at least one value or means for generating at least one value.

288. A computer program according to embodiment 287 where the payment authorization data comprises a credit card number.

289. A computer program according to embodiment 287 or 288 where the payment authorization data comprises a one-time password or one-time key.

290. A method of authenticating a document by means of a computer program according to any of embodiments 181-289.

291. A method of authenticating at least a part of a document by means of a computer program according to any of embodiments 181-290.

292. A method authenticating a part of a document according to embodiment 290 or 291 where the document contains information defining which part or parts of the document to authenticate.

293. A method of decrypting a document by means of a computer program according to any of embodiments 181-292.

294. A method of decrypting at least a part of a document by means of a computer program according to any of embodiments 181-293.

295. A method of creating an authentication tag to be used to authenticate data entered into a document by means of a computer program according to any of embodiments 181-294.

296. A method of creating an authentication tag to be used to authenticate at least a part of data entered into a document by means of a computer program according to any of embodiments 181-294.

297. A method of creating an authentication tag according to embodiment 296 where the document contains information defining which part or parts of the data to authenticate.

298. A method according to embodiment 292 or 297 where the information defining which parts to authenticate is stored in the document in encrypted form.

299. A method according to any of embodiments 292, 297, and 298 where the information defining which parts to authenticate is stored in the document in authenticated form.

300. A method of encrypting data entered into a document by means of a computer program according to any of embodiments 181-299.

301. A method of encrypting at least a part of data entered into a document by means of a computer program according to any of embodiments 181-300.

302. A method according to any of embodiments 290-301 where the document format is HTML, XHTML, XML, PDF, a word processing format, a spreadsheet format, a database format, a graphical format, a sound format, or a video format.

303. A method according to any of embodiments 290-302 where the computer program is embedded into the document.

304. A method according to any of embodiments 290-303 where the computer program is embedded into a document containing the document.

305. A method according to any of embodiments 290-304 where at least one document containing the document in which the computer program is embedded is authenticated.

306. A method according to embodiment 305 where at least the document and the containing document are authenticated.

307. A method according to any of embodiments 290-306 where the authentication process is repeated a number of times.

308. A method according to embodiment 307 where the event of changes being made to data entered into a document initiates a new authentication process.

309. A method according to embodiment 307 or 308 where the event of changes being made to a document initiates a new authentication process.

310. A method according to any of embodiments 290-309 where at least one document contained by the document in which the computer program is embedded is authenticated.

311. A method according to any of embodiments 290-310 where data sent to a web server contains an authentication tag calculated from data previously received from the server such that the server can verify if the data was correctly received.

312. A method according to any of embodiments 290-310 where data sent to a server contains an authentication tag calculated from at least a part of data previously received from the server such that the server can verify if the data was correctly received.

313. A method according to any of embodiments 290-312 where data sent to a server contains an authentication tag calculated from at least a part of the data sent to the server such that the server can verity if the received data is correct.

314. A proxy server that modifies documents sent from at least one web server such that at least a part of the documents is at least one of authenticated and encrypted according to any of embodiments 290-313.

315. A proxy server that modifies documents sent from at least one server such that at least a part of the documents is at least one of authenticated and encrypted according to any of embodiments 290-314.

316. A proxy server that modifies data sent to at least one web server such that integrity of at least a part of the data sent to the server is verified according to any of embodiments 290-315.

317. A proxy server that modifies data sent to at least one server such that integrity of at least a part of the data sent to the server is verified according to any of embodiments 290-316.

318. A proxy server that processes data sent to at least one server such that integrity of at least a part of the data sent to the server is verified according to any of embodiments 290-317.

319. A proxy server that modifies data sent to at least one server such that integrity of data previously sent from the server is verified according to any of embodiments 290-318.

320. A proxy server that processes data sent to at least one server such that integrity of data previously sent from the server is verified according to any of embodiments 290-319.

321. A computer program according to any of embodiments 181-320 where suspicious behavior on the computer executing the computer program is detected and reported to a server.

322. A computer program according to embodiment 321 where suspicious behavior is defined as at least one of:
  the user interface of the program or a part thereof is not visible to the user,
  the user interface of the program is not in focus, and
  the user interface of the program is not on top.

323. A computer program according to embodiment 321 or 322 that is extra aware of suspicious behavior when the user performs certain actions.

324. A computer program according to embodiment 321 or 322 that is extra aware of suspicious behavior when the user types data into a document.

325. A computer program according to any of embodiments 181-322 capable of sending e-mail.

326. A computer program according to any of embodiments 181-325 inserted into a file.

327. A server from which computer programs according to any of embodiments 181-326 can be downloaded.

328. A server according to embodiment 327 which has different versions of the computer program to be downloaded; the server decides which one to send according to predefined criteria.

329. A server according to embodiment 328 where the decision depends on knowledge about the computer downloading the computer program.

330. A server communicating with at computer program according to any of embodiments 181-326.

331. A file written by computer program according to any of embodiments 181-326.

332. An file encrypted using a key; the decryption key can be derived or decrypted using an embedded at least one value or means for generating at least one value in a computer program according to any of embodiments 181-326.

333. Data sent over a network; the data is encrypted by a computer program according to any of embodiments 181-326.

334. Data sent over a network; the data is encrypted using a key; the decryption key can be derived or decrypted using an embedded at least one value or means for generating at least one value in a computer program according to any of embodiments 181-326.

335. Data sent over a network; the data is authenticated by a computer program according to any of embodiments 181-326.

336. A document into which at least one computer program according to any embodiments 181-326 is embedded.

337. A computer on which at least one computer program according to any of embodiments 181-326 is stored or executed.

338. A method of generating a one-time password, the method including the steps of any of embodiments 181-337.

339. A method of generating a one-time password in a device comprising a computer-executable program file fabricated from a source code, the computer program including, in said computer-executable program file, at least one embedded value or means for generating at least one value, said value being uniquely selected or uniquely generated for the computer-executable program file, whereby the computer-executable program file is capable of carrying out instructions provided by the source code and of generating a unique output, which depends from said uniquely selected or uniquely generated value, the method further comprising the step of processing said unique output to generate said one-time password.

340. A method according to embodiment 338 or 339 where the one-time password is derived from an embedded at least one value or means for generating at least one value.

341. A method according to embodiment 338 or 339 where the one-time password is derived from a master key; the master key is derived from an embedded at least one value or means for generating at least one value.

342. A method according to any of embodiments 338-341 where the one-time password is derived from a counter value; the counter is increased each time a one-time password is generated.

343. A method according to any of embodiments 338-342 where the one-time password is derived from a time stamp.

344. A device containing a one-time password generator constructed according to any of embodiments 338-343.

345. A computer network comprising a server and a plurality of clients, wherein each client is loaded with a copy of a first computer program, and wherein the server is loaded with a second computer program, each copy of the first computer program comprising:
  a computer-executable program file fabricated from a source code, which is common to all copies of the first computer program;
  at least one embedded value or means for generating at least one value, said value or said means being included in said computer-executable program file, said value being uniquely selected or uniquely generated for the computer-executable program file, whereby the computer-executable program file is capable of carrying out instructions provided by the common source code and of generating a unique output, which depends from said uniquely selected or uniquely generated value; the computer network being programmed to communicate said unique output from each of the clients to the server, so as to enable the second computer program to authenticate each copy of the first computer program based on said output.

346. A computer network according to embodiment 345, wherein each computer-executable program file is fabricated by a method according to any of embodiments 44-180.

347. A server for use in a computer network according to embodiment 345 or 346, the server being suited for communication with said plurality of clients via the computer network, said second computer program being adapted to authenticate each copy of said first computer program based on said unique output.

348. A method of collecting information about at least one of: user behavior, file positions, time, date, place, hardware profile, and software environment; the data is analyzed to estimate if a transaction is authentic.

349. A method according to embodiment 348 where the collected information is used to estimate if the transaction data was entered by a human being or a computer program or an electronic device.

350. A method according to embodiment 348 or 349 where at least two kinds of information are collected, a score is calculated for each kind of information, the scores are combined to obtain a combined score, and the combined score is used to obtain the estimate.

351. A method according to embodiment 350 where scores are calculated for groups of information from individual sources.

352. A method according to embodiment 350 or 351 where at least one score is weighted differently compared to at least one other score.

353. A method according to any of embodiments 350-352 where a total score above a certain level triggers further investigation of the authenticity of a transaction.

354. A method according to any of embodiments 350-353 where a total score above a certain level triggers a rejection of a transaction.

355. A method of preventing fraud in electronic transaction systems by attracting attention to changes in input fields by visual highlighting or an audio signal.

356. A method according to embodiment 355 where an input field is highlighted by changing the color at least once of at least one of: the field's background, the field's frame, the field's caption and the field's content least.

357. A method of preventing fraud in electronic transaction systems by adding delays when shifting between different input fields.

358. A method of preventing fraud in electronic transaction systems by enabling a method according to any of embodiments 355-357 when potential fraud is detected according to any of embodiments 348-354.

359. A method of fabricating a computer program according to any of embodiments 348-358 with an embedded at least one value or means for generating at least one value according to any of embodiments 44-180.

360. A computer program according to any of embodiments 348-359 with an embedded at least one value or means for generating at least one value according to any of embodiments 181-344.

361. A method of adding information to an electronic form on a client computer in a computer network comprising at least said client computer and a server, comprising:
prompting, in a user interface of the client computer, a user of the client computer to enter at least one selected kind of information into said form;
receiving said selected kind of information as a user input;
sending said selected kind of information to the server via the network;
processing said selected kind of information at the server to produce response information;
sending said response information to the client computer via the network;
displaying said response information in the user interface of the client computer;
wherein said steps of sending and said step of receiving are performed, while the user performs further actions in the electronic form.

362. A method according to embodiment 361 where the information sent to a server is an account number; the response information is information about the owner of the account with that account number.

363. A method according to embodiment 361 where the information sent to the server is an account number; the response information is the amount of cash available on that account.

364. A method of fabricating a computer program according to any of embodiments 361-363 with an embedded at least one value or means for generating at least one value according to any of embodiments 44-180.

365. A computer program according to any of embodiments 361-363 with an embedded at least one value or means for generating at least one value according to any of embodiments 181-344.

366. A method of verifying at least one user input to a computer system, which comprises a speech circuitry and a user-input receiving system, the method comprising:
receiving the at least one user input by means of the user-input system;
processing at least a portion of the at least one user input to generate an activation signal for the speech circuitry, so as to cause the speech circuitry to pronounce an audible representation of said portion of the at least one user input;
prompting the user to verify said portion of the at least one user input, which has been pronounced by the speech circuitry;
receiving the user's verification of said pronounced portion of the at least one user input by means of said user-input system.

367. A method according to embodiment 366, wherein the computer system is programmed to perform bank transactions, and wherein said at least one user input comprises bank transaction details.

368. A method according to embodiment 367, wherein said portion of the at least one user input includes at least one of: a destination account specification, a source account specification, an amount to be transferred, and a payment date.

369. A method of fabricating a computer program according to any of embodiments 366-368 with an embedded at least one value or means for generating at least one value according to any of embodiments 44-180.

370. A computer program according to any of embodiments 366-369 with an embedded at least one value or means for generating at least one value according to any of embodiments 181-344.

371. A method of generating a combined software component, comprising:
providing at least two non-combined software components, which are intended to be combined by an operating system at runtime or in a runtime environment;
combining said at least two non-combined software components into a pre-combined software component before runtime;

adding, to said pre-combined software component, functionality for performing operations that would have been performed by the operating system or the runtime environment, if the non-combined software components were combined at runtime, to thereby generate said combined software component.

372. A method according to embodiment 371 where at least one of the software components is a function implementations, a class, a library file, or a program file.

373. A method according to embodiment 371 or 372 where at least one of the software components is a Java .class files, a Java .java files, or a function implementation is such files.

374. A method according to any of embodiments 371-373 where at least one of the software components is a .dll file or a function in such file.

375. A method according to embodiment 371, 372, or 374 where an .exe or a .dll file is derived from resulting software component.

376. A method according to any of embodiments 371-375 where at least one of the added means for handling tasks that otherwise would be handled by the runtime environment or operating system is means for handling memory allocation, stack operations, or errors.

377. A method according to any of embodiments 371-376 where the destination address of at least one jump instruction in the combined software component is read from a table.

378. A method according to any of embodiments 371-377 where at least one parameter to at least one instruction in the combined software component is read from a table.

379. A method according to embodiment 377 or 378 where at least a part of the table is downloaded from a server.

380. A method according to embodiment 379 where the at least a part of the table have a pre-defined value that is used until the at least a part of the table is downloaded from a server.

381. A method according to any of embodiments 377-380 where at least a part of the table is decrypted at runtime.

382. A method according to embodiment 381 where the decryption key is derived from the embedded at least one value or means for generating at least one value.

383. A method according to embodiment 381 where the decryption key is downloaded from a server.

384. A software component combined according to any of embodiments 371-383.

385. A computer-readable data medium comprising a software component according to embodiment 384.

386. A computer loaded with a software component according to embodiment 384.

387. A number of software components, which at runtime are linked together, at least one of the software components is a resulting software component or is derived from a resulting software component according to any of embodiments 371-383.

388. A method of fabricating a computer program according to any of embodiments 371-383 with an embedded at least one value or means for generating at least one value according to any of embodiments 44-180.

389. A computer program according to any of embodiments 371-383 with an embedded at least one value or means for generating at least one value according to any of embodiments 181-344.

390. A server communicating with a client computer program comprising a computer-executable program file fabricated from a source code, the computer program including, in said computer-executable program file, at least one embedded value or means for generating at least one value, said value being uniquely selected or uniquely generated for the computer-executable program file, whereby the computer-executable program file is capable of carrying out instructions provided by the source code and of generating a unique output, which depends from said uniquely selected or uniquely generated value.

391. A server according to embodiment 390 with functionality that allows it to recreate at least one of
    at least one of the at least one embedded values, and
    at least a part of the embedded means for generating at least one value as is embedded in a Client Program.

392. A server according to embodiment 390 that can load from a database or file at least one of
    at least one of the at least one embedded values, and
    at least a part of the embedded means for generating at least one value
as is embedded in a Client Program.

393. A server according to any of embodiments 390-392 that can load from a database or file the PRNG seed that was used to generate the string of pseudo-random bits that determined at least one of
    at least one of the at least one embedded values, and
    how to construct at least a part of the embedded means for generating at least one value
when a Client Program file was fabricated.

394. A server according to embodiment 390 that can load and use a software module containing at least one of:
    at least one of the at least one embedded values, and
    at least a part of the embedded means for generating at least one value.

395. A server according to embodiment 394 where the loaded software module is stored in a file with program code that is linked with the server's program code at runtime.

396. A server according to embodiment 395 where the loaded software module is stored in a .dll file.

397: A server according to any of embodiments 390-396 where the recreated or loaded at least one value or means for generating at least one value is kept ready-to-use for a certain period of time after the session with the relevant program has ended such that the recreated or loaded at least one value or means for generating at least one value is ready for use in case of the given program connects to the server again within the given period of time.

398. A server according to any of embodiments 390-397 having a list of which rights are assigned to which types of Client Programs.

399. A server according to any of embodiments 390-398 having a list of which rights are assigned to which copies of the Client Program.

400. A server according to embodiment 398 or 399 where the assigned rights relate to which data types Client Program may read or write.

401. A server according to embodiment 398 or 399 where the assigned rights relate to which instances of data Client Program may read or write.

402. A server according to embodiment 398 or 399 where the assigned rights relates to who are allowed to execute Client Program.

403. A server according to embodiment 398 or 399 where the assigned rights relate to when a Client Program is allowed to be executed.

404. A server according to embodiment 398 or 399 where the assigned rights relates to when a Client Program is allowed to access which data.

405. A server according to any of embodiments 398-404 where a Client Program connects to the server to download information about its rights.

406. A server according to embodiment 405 where the downloaded information about the Client Programs rights is stored on disk by the Client Program.
407. A server according to any of embodiments 398-406 where a Client Program connects to the server to download cryptographic keys that can be used to encrypt, decrypt, or authenticate data.
408. A server according to embodiment 407 that refuses to provide keys to access types of data or copies of data that the Client Program is not allowed to access.
409. A server according to any of embodiments 398-408 where a log file is maintained with information about which Client Programs have been given which rights.
410. A server according to any of embodiments 398-409 where a log file is maintained with information about which Client Programs have been given which cryptographic keys.
411. A server according to any of embodiments 390-410 where key exchange protocol data communicated with a Client Program is encrypted or decrypted using a cryptographic key derived from an embedded at least one value or means for generating at least one value in the Client Program.
412. A server according to any of embodiments 390-410 where key exchange protocol data communicated with a Client Program is authenticated using a cryptographic key derived from an embedded at least one value or means for generating at least one value in the Client Program.
413. A server according to embodiment 411 or 412 where the key exchange protocol is the Diffie-Hellman protocol.
414. A server according to any of embodiments 411-413 where the key exchange protocol is used to derive a symmetrical cryptographic key.
415. A server according to any of embodiments 390-414 where an asymmetric key is encrypted or decrypted using a cryptographic key derived from an embedded at least one value or means for generating at least one value in the Client Program.
416. A server according to any of embodiments 390-415 where an asymmetric key is authenticated using a cryptographic key derived from an embedded at least one value or means for generating at least one value in the Client Program.
417. A server according to embodiment 415 or 416 where the asymmetric key is a public RSA key or a private RSA key.
418. A server according to embodiment 415 or 416 where the asymmetric key is a public ECC key or a private ECC key.
419. A server according to any of embodiments 415-418 where the asymmetric key is used to derive a symmetrical cryptographic key.
420. A server according to embodiment 415 or 419 where the symmetrical key is used to encrypt or decrypt data.
421. A server according to any of embodiments 414, 419, and 420 where the symmetrical key is used to authenticate data.
422. A server according to any of embodiments 390-421 where Client Programs with functionality for sending e-mail, sending instant messages, or conducting phone calls connecting to the server are authenticated.
423. A server according to embodiment 422 where Client Programs with functionality for sending e-mail, sending instant messages, or conducting phone calls that cannot authenticate themselves are rejected.
424. A server according to embodiment 422 or 423 that adds special headers to e-mails, instant messages, or phone calls received from an authenticated Client Program.
425. A server according to any of embodiments 422-424 that signs e-mails, instant messages, or phone calls received from an authenticated Client Program.
426. A server according to any of embodiments 422-425 maintaining a list of black-listed Client Programs.
427. A server according to any of embodiments 390-426 where credit card information is encrypted or decrypted using a cryptographic key derived from an embedded at least one value or means for generating at least one value in the Client Program.
428. A server according to any of embodiments 390-427 where payment authorization data is encrypted or decrypted using a cryptographic key derived from an embedded at least one value or means for generating at least one value in the Client Program.
429. A server according to embodiment 428 where the payment authorization data comprises a credit card number.
430. A server according to embodiment 428 or 429 where the payment authorization data comprises a one-time password or one-time key.
431. A computer program communicating with a server according to any of embodiments 390-430.
432. A file encrypted by a server according to any of embodiments 390-431.
433. Data sent over a network; the data is encrypted by a server according to any of embodiments 390-430.
434. Data sent over a network; the data is authenticated by a server according to any of embodiments 390-430.
435. A computer-readable data medium comprising server software according to any of embodiments 390-430.
436. A computer program communicating with a server according to any of embodiments 390-430.
437. A device communicating with a server according to any of embodiments 390-430.

The invention claimed is:

1. A method of verifying if a request for a second digital document originates from a reference within an authentic copy of a first digital document, the method comprising:
   a first computer sends the first digital document to a second computer via a computer network;
   the second computer receives a possibly tampered version of the first digital document via the computer network;
   the first computer computes a first authentication tag on at least a part of the first digital document;
   the second computer computes a second authentication tag on at least a part of the possibly tampered version of the first digital document;
   the second computer sends the request for the second digital document referenced in the possibly tampered version of the first digital document to the first computer via the computer network, the request including the second authentication tag;
   the first computer receives a possibly tampered version of the request and deducts the second authentication tag;
   the first computer considers the possibly tampered version of the request as originating from an authentic copy of the first digital document if the second authentication tag is equal to the first authentication tag; and
   the first computer causes the second document to be sent to the second computer only if the second authentication tag is equal to the first authentication tag.

2. The method according to claim 1 further comprising:
   the second computer collects the digital data to be included in a request for the second digital document;
   the second computer computes a third authentication tag on at least a part of the digital data;
   the second computer includes the digital data and the third authentication tag in the request sent to the first computer;
   the first computer also deducts the digital data and the third authentication tag from the possibly tampered version of the request;

the first computer computes a fourth authentication tag on at least a part of the digital data attached to the possibly tampered version of the request;

the first computer considers the digital data attached to the possibly tampered version of the request as authentic if the third authentication tag is equal to the fourth authentication tag.

3. The method according to claim 1 wherein the first authentication tag is stored on the first computer from a first point in time when the first digital document is sent to the second computer to a second point in time when the first authentication tag is compared with the second authentication tag, and wherein the transmission of the first digital document from the first computer does not include the first authentication tag.

4. The method according to claim 1 where the first authentication tag is inserted into the first digital document in encrypted or authenticated form by the first computer; the encrypted or authenticated first authentication tag is included in the request by the second computer; the encrypted or authenticated first authentication tag deducted from the possibly tampered version of the request is decrypted or verified by the second computer before being compared to the second authentication tag.

5. The method according to claim 1 where the second authentication tag or the third authentication tag is encrypted or authenticated by the second computer and transmitted in encrypted or authenticated form to the first computer.

6. The method according to claim 1 where the first computer is a web server or a proxy server.

7. The method according to claim 1 where the second computer is a web browser.

8. The method according to claim 1 where the first computer refuses to send the second digital document to the second computer if at least one of the possibly tampered version of the first digital document and the digital data is not authentic.

9. The method according to claim 1 where at least one of the second authentication tag and the third authentication tag is computed more than once by the second computer.

10. The method according to claim 9 where at least one of the second authentication tag and the third authentication tag is computed on at least one of the following events:
the document is loaded,
the document is shown,
a link in the document is activated,
script code in the document is activated or executed,
an amount of time has elapsed,
a change has occurred to the possibly tampered version of the first digital document, and
a change has occurred to user data entered into the possibly tampered version.

11. The method according to claim 1 where at least two of said authentication tags are computed on at least two different parts of the possibly tampered version of the first digital document or on at least two different parts of the first digital document.

12. The method according to claim 1 where at least one authentication tag is calculated by at least one of the following,
a hash function,
a message authentication code function, and
an asymmetric digital signature algorithm.

13. The method according to claim 1 where an authentication tag that authenticates at least some of the data in the first digital document is also provided in the first digital document itself.

14. The method according to claim 1 where a computer program is embedded into the first digital document or referenced in the first digital document, the computer program being adapted to calculate at least some of the authentication tags to be included in the request.

15. The method according to claim 1, wherein at least one of said authentication tags is computed by a computer program, and wherein each user or group of users uses a different computer-executable program file to run the computer program.

16. The method according to claim 15 where the computer-executable program file is fabricated from a source code, the computer program including, in said computer-executable program file, at least one embedded value or means for generating at least one value, said value being uniquely selected or uniquely generated for the computer-executable program file, whereby the computer-executable program file is capable of carrying out instructions provided by the source code and of generating a unique output, which depends from said uniquely selected or uniquely generated value.

17. The method according to claim 16 where the embedded means for generating at least one value comprises at least one extractor subfunction.

18. The method according to claim 17 where at least one of the extractor subfunctions is uniquely selected for each computer-executable program file.

19. The method according to claim 1 where at least one reference in the first digital document is replaced by the first computer with a substitute reference; the substitute reference is unique for the first digital document or for a specific copy of the first digital document; the first computer maintains a table of substitute references such that it can identify which digital document to send to the second computer when the second computer requests a substitute referenced digital document.

20. The method according to claim 1 where a computer program running on the second computer oversees relevant actions on that computer in order to detect unusual behavior.

21. The method according to claim 20 where the computer program running on the second computer that oversees relevant actions also computes at least one of the authentication tags to be included in the request.

22. The method according to claim 20 where data recorded in order to detect unusual behavior includes at least one of:
timing of input data received from the user,
value of input data received from the user, and
visibility of data to be presented to the user.

23. The method according to claim 20 where the second computer sends a report to the first computer on detected behavior on the second computer.

24. The method according to claim 20 where the second computer stores a copy of at least a part of the last accepted state of user data typed into the possibly tampered version of the first digital document, and wherein, if unusual behavior is detected while the user data in the possibly tampered version of the first digital document is edited, at least a part of the user data in the possibly tampered version of the first digital document is rolled back to the last accepted state by overwriting the at least a part of the user data in the possibly tampered version of the first digital document with the stored copy of the at least a part of the last accepted state.

25. The method according to claim 1 where rules define constraints on the content of those parts of the possibly tampered version of the first digital document not included in calculating the second authentication tag.

26. The method according to claim 25 where the rules define that at least some of those parts of the possibly tampered version of the first digital document not included in calculating the second authentication tag may only be displayed in predetermined parts of the graphical user interface of the second computer.

27. The method according to claim 25 where the rules are included in the first digital document or downloaded from the first computer.

28. The method according to claim 1 where the first computer embeds a value into the first digital document, and wherein at least one authentication tag computed by the second computer depends on that embedded value.

29. The method according to claim 28 where the value embedded into the first digital document is unique for each copy of the first digital document sent from the first computer.

* * * * *